(12) United States Patent
Gopalan et al.

(10) Patent No.: US 11,684,115 B2
(45) Date of Patent: Jun. 27, 2023

(54) ROOFING MEMBRANES, COMPOSITIONS, AND METHODS OF MAKING THE SAME

(71) Applicant: Cooper-Standard Automotive Inc., Novi, MI (US)

(72) Inventors: Krishnamachari Gopalan, Troy, MI (US); Robert J. Lenhart, Fort Wayne, IN (US); Gending Ji, Waterloo (CA); Roland Herd-Smith, Brignancourt (FR)

(73) Assignee: COOPER-STANDARD AUTOMOTIVE INC., Novi, MI (US)

( * ) Notice: Subject to any disclaimer, the term of this patent is extended or adjusted under 35 U.S.C. 154(b) by 417 days.

(21) Appl. No.: 16/144,719

(22) Filed: Sep. 27, 2018

(65) Prior Publication Data

US 2019/0045881 A1 Feb. 14, 2019

Related U.S. Application Data

(63) Continuation of application No. 15/836,417, filed on Dec. 8, 2017, now abandoned.
(Continued)

(51) Int. Cl.
*A43B 13/04* (2006.01)
*C08L 23/06* (2006.01)
(Continued)

(52) U.S. Cl.
CPC ............ *A43B 13/04* (2013.01); *A43B 13/187* (2013.01); *B29D 35/122* (2013.01); *B32B 5/028* (2013.01);
(Continued)

(58) Field of Classification Search
CPC ....... C08J 3/246; C08J 9/06; C08J 9/32; C08J 5/18; C08J 3/24; C08J 9/0061;
(Continued)

(56) References Cited

U.S. PATENT DOCUMENTS 3,644,315 A 2/1972 Gardner et al.
3,646,155 A 2/1972 Scott
(Continued)

FOREIGN PATENT DOCUMENTS

EP 0913427 A1 6/1999
EP 920876 A2 6/1999
(Continued)

OTHER PUBLICATIONS

Melo, et al., Silane Crosslinked Polyethylene from Different Commercial PE's: Influence of Comonomer, Catalyst Type and Evaluation of HLPB as Crosslinking Coagent, Apr. 2015, Materials Reasearch, obtained from http://www.scielo.br/scielo.php?script=sci_issuetoc&pid=1516-143920150002&Ing=en&nrm=iso (Year: 2015).*
(Continued)

*Primary Examiner* — Brian Handville
(74) *Attorney, Agent, or Firm* — Brooks Kushman P.C.

(57) ABSTRACT

A roofing membrane and a method of making the same is provided. The roofing membrane includes a top layer having a flame retardant and a first silane-crosslinked polyolefin elastomer with a density less than 0.90 g/cm³; a scrim layer; and a bottom layer having a flame retardant and a second silane-crosslinked polyolefin elastomer with a density less than 0.90 g/cm³. The top and bottom layers of the roofing membrane both exhibit a compression set of from about 5.0% to about 35.0%, as measured according to ASTM D 395 (22 hrs @ 70° C.).

9 Claims, 9 Drawing Sheets

Related U.S. Application Data

(60) Provisional application No. 62/497,959, filed on Dec. 10, 2016, provisional application No. 62/497,954, filed on Dec. 10, 2016.

(51) Int. Cl.

| | | |
|---|---|---|
| *C08L 23/12* | (2006.01) |
| *C08L 23/14* | (2006.01) |
| *C08J 9/00* | (2006.01) |
| *C08J 3/24* | (2006.01) |
| *C08F 255/02* | (2006.01) |
| *C08K 5/00* | (2006.01) |
| *A43B 13/18* | (2006.01) |
| *B29D 35/12* | (2010.01) |
| *B32B 27/12* | (2006.01) |
| *B32B 27/26* | (2006.01) |
| *C08F 8/00* | (2006.01) |
| *C08F 8/12* | (2006.01) |
| *C08L 43/04* | (2006.01) |
| *C08L 51/06* | (2006.01) |
| *C08L 53/00* | (2006.01) |
| *C08J 9/06* | (2006.01) |
| *C08J 9/32* | (2006.01) |
| *C08J 9/12* | (2006.01) |
| *C08F 230/08* | (2006.01) |
| *B32B 5/02* | (2006.01) |
| *B32B 27/32* | (2006.01) |
| *B32B 37/15* | (2006.01) |
| *C08J 5/18* | (2006.01) |
| *E04D 5/06* | (2006.01) |
| *E04D 5/10* | (2006.01) |
| *C08F 210/02* | (2006.01) |
| *C08F 210/06* | (2006.01) |
| *C08K 5/5419* | (2006.01) |
| *C08L 23/08* | (2006.01) |
| *C08L 101/00* | (2006.01) |
| *C08K 3/22* | (2006.01) |
| *C08L 23/16* | (2006.01) |
| *C08L 23/20* | (2006.01) |
| *C09K 3/10* | (2006.01) |
| *C08G 77/442* | (2006.01) |
| *D06N 5/00* | (2006.01) |

(52) U.S. Cl.
CPC .............. *B32B 27/12* (2013.01); *B32B 27/26* (2013.01); *B32B 27/32* (2013.01); *B32B 37/15* (2013.01); *C08F 8/00* (2013.01); *C08F 8/12* (2013.01); *C08F 210/02* (2013.01); *C08F 210/06* (2013.01); *C08F 230/085* (2020.02); *C08F 255/02* (2013.01); *C08G 77/442* (2013.01); *C08J 3/24* (2013.01); *C08J 3/246* (2013.01); *C08J 5/18* (2013.01); *C08J 9/0061* (2013.01); *C08J 9/06* (2013.01); *C08J 9/122* (2013.01); *C08J 9/32* (2013.01); *C08K 3/22* (2013.01); *C08K 5/00* (2013.01); *C08K 5/0025* (2013.01); *C08K 5/5419* (2013.01); *C08L 23/06* (2013.01); *C08L 23/08* (2013.01); *C08L 23/0815* (2013.01); *C08L 23/12* (2013.01); *C08L 23/14* (2013.01); *C08L 23/16* (2013.01); *C08L 23/20* (2013.01); *C08L 43/04* (2013.01); *C08L 51/06* (2013.01); *C08L 53/00* (2013.01); *C08L 101/00* (2013.01); *C09K 3/1006* (2013.01); *D06N 5/00* (2013.01); *E04D 5/06* (2013.01); *E04D 5/10* (2013.01); *B32B 2274/00* (2013.01); *B32B 2305/72* (2013.01); *B32B 2307/3065* (2013.01); *B32B 2307/72* (2013.01); *B32B 2419/06* (2013.01); *C08F 2500/08* (2013.01); *C08F 2500/21* (2013.01); *C08F 2800/20* (2013.01); *C08F 2810/20* (2013.01); *C08J 2201/026* (2013.01); *C08J 2201/03* (2013.01); *C08J 2203/04* (2013.01); *C08J 2203/06* (2013.01); *C08J 2203/08* (2013.01); *C08J 2205/052* (2013.01); *C08J 2207/00* (2013.01); *C08J 2300/26* (2013.01); *C08J 2323/08* (2013.01); *C08J 2323/12* (2013.01); *C08J 2323/16* (2013.01); *C08J 2383/10* (2013.01); *C08J 2423/06* (2013.01); *C08J 2423/08* (2013.01); *C08J 2423/12* (2013.01); *C08J 2423/14* (2013.01); *C08J 2423/16* (2013.01); *C08L 2205/02* (2013.01); *C08L 2312/08* (2013.01); *C09K 2200/0617* (2013.01)

(58) Field of Classification Search
CPC .............. C08J 2201/026; C08J 2323/08; C08J 2323/12; C08J 2323/16; C08J 2423/08; C08J 2423/16; C08J 2300/26; C08J 2423/06; C08J 2423/12; C08J 2423/14; C08J 2203/04; C08J 2383/10; E04D 5/10; E04D 5/06; C09K 3/1006; C09K 2200/0617; A43B 13/04; A43B 13/187; B32B 37/15; B32B 27/32; B32B 5/028; B32B 27/12; B32B 27/26; B32B 2307/3065; B32B 2419/06; B32B 2307/72; B32B 2305/72

See application file for complete search history.

(56) References Cited

U.S. PATENT DOCUMENTS

| | | |
|---|---|---|
| 3,682,201 A | 8/1972 | Atwell et al. |
| 4,076,698 A | 2/1978 | Anderson et al. |
| 4,412,042 A | 10/1983 | Matsuura et al. |
| 4,419,844 A | 12/1983 | Kreisfeld |
| 4,515,210 A | 5/1985 | Smith et al. |
| 4,614,208 A | 9/1986 | Skarelius |
| 4,618,654 A | 10/1986 | Schmidtchen et al. |
| 4,798,864 A | 1/1989 | Topcik |
| 4,803,244 A | 2/1989 | Umpleby |
| 4,806,594 A | 2/1989 | Gross et al. |
| 4,818,789 A | 4/1989 | Tomko et al. |
| 4,870,136 A | 9/1989 | Yagi et al. |
| 4,894,281 A | 1/1990 | Yagi et al. |
| 4,927,184 A | 5/1990 | Bourjot et al. |
| 4,927,871 A | 5/1990 | Ohori et al. |
| 5,145,628 A | 9/1992 | Karg et al. |
| 5,252,660 A | 10/1993 | Hazan et al. |
| 5,266,627 A | 11/1993 | Meverden et al. |
| 5,272,236 A | 12/1993 | Lai et al. |
| 5,278,272 A | 1/1994 | Lai et al. |
| 5,741,858 A | 4/1998 | Brann et al. |
| 5,814,254 A | 9/1998 | Bisconti |
| 5,824,718 A | 10/1998 | Penfold et al. |
| 5,837,174 A | 11/1998 | Bisconti |
| 5,868,981 A | 2/1999 | Bisconti |
| 5,880,192 A | 3/1999 | Brown et al. |
| 5,883,144 A | 3/1999 | Bambara et al. |
| 5,974,694 A | 11/1999 | Vecchiola |
| 5,986,002 A | 11/1999 | Hwang et al. |
| 5,994,474 A | 11/1999 | Wey et al. |
| 6,048,935 A | 4/2000 | Penfold et al. |
| 6,068,026 A | 5/2000 | Garois |
| 6,235,848 B1 | 5/2001 | Bickert et al. |
| 6,316,512 B1 | 11/2001 | Bambara et al. |
| 6,361,842 B1 | 3/2002 | Stachowiak |
| 6,395,791 B1 | 5/2002 | Chaudhary et al. |
| 6,399,708 B2 | 6/2002 | Valligny et al. |
| 6,476,132 B1 | 11/2002 | Abdou-Sabet et al. |
| 6,652,937 B1 | 11/2003 | Guo et al. |

(56) References Cited

U.S. PATENT DOCUMENTS

| | | | |
|---|---|---|---|
| 6,794,453 | B2 | 9/2004 | Jackson et al. |
| 6,828,011 | B2 | 12/2004 | Yu et al. |
| 6,864,315 | B1 | 3/2005 | Hakuta et al. |
| 7,041,744 | B2 | 5/2006 | Palmlöf et al. |
| 7,279,529 | B2 | 10/2007 | Hogge et al. |
| 7,281,547 | B2 | 10/2007 | Cleveland et al. |
| 7,834,115 | B2 | 11/2010 | Johansson et al. |
| 3,017,710 | A1 | 9/2011 | Sultan et al. |
| 8,205,391 | B2 | 6/2012 | Aritake et al. |
| 8,299,166 | B2 | 10/2012 | Carlsson |
| 8,318,864 | B2 | 11/2012 | Harris et al. |
| 8,387,625 | B2 | 3/2013 | Kawata et al. |
| 8,728,600 | B1 | 5/2014 | Hayes |
| 8,835,548 | B2 | 9/2014 | Esseghir et al. |
| 9,115,620 | B2 | 8/2015 | Doneva et al. |
| 9,127,110 | B2 | 9/2015 | Sugita et al. |
| 9,387,625 | B2 | 7/2016 | Esseghir et al. |
| 2004/0006179 | A1 | 1/2004 | Graf |
| 2004/0045619 | A1 | 3/2004 | Backman et al. |
| 2004/0103948 | A1 | 6/2004 | Scheelen et al. |
| 2004/0157053 | A1 | 8/2004 | Yu et al. |
| 2004/0265524 | A1 | 12/2004 | Wideman et al. |
| 2004/0265563 | A1 | 12/2004 | Sakai et al. |
| 2005/0095374 | A1 | 5/2005 | Cothran et al. |
| 2005/0100747 | A1 | 5/2005 | Gopalan et al. |
| 2005/0269737 | A1* | 12/2005 | Hogge ............... A63B 37/0003 264/236 |
| 2006/0185750 | A1 | 8/2006 | Mestemacher |
| 2007/0027250 | A1* | 2/2007 | Joseph ............... C08L 23/0815 524/515 |
| 2007/0122570 | A1 | 3/2007 | Honda et al. |
| 2008/0023215 | A1 | 1/2008 | Uehara et al. |
| 2008/0097038 | A1 | 4/2008 | Biscoglio et al. |
| 2008/0306217 | A1 | 12/2008 | Karjala et al. |
| 2008/0314470 | A1 | 12/2008 | Trace et al. |
| 2009/0143531 | A1 | 6/2009 | Ouhadi et al. |
| 2010/0029827 | A1* | 2/2010 | Ansems ............... B32B 27/08 524/451 |
| 2010/0162657 | A1 | 7/2010 | Swei et al. |
| 2010/0209705 | A1 | 8/2010 | Lin et al. |
| 2010/0249256 | A1 | 9/2010 | Moscardi et al. |
| 2011/0144277 | A1 | 6/2011 | Weissenbach et al. |
| 2011/0144278 | A1 | 6/2011 | Weissenbach et al. |
| 2011/0146792 | A1 | 6/2011 | Wu et al. |
| 2011/0172367 | A1 | 7/2011 | Backer et al. |
| 2011/0259464 | A1 | 10/2011 | Lacroix et al. |
| 2012/0042980 | A1 | 2/2012 | Mezzalira et al. |
| 2012/0145275 | A1 | 6/2012 | Seebold et al. |
| 2012/0171496 | A1 | 7/2012 | Esseghir et al. |
| 2012/0178867 | A1 | 7/2012 | Esseghir et al. |
| 2012/0312581 | A1 | 12/2012 | Yasuda et al. |
| 2014/0191161 | A1 | 7/2014 | Amako et al. |
| 2015/0047264 | A1 | 2/2015 | Kobayashi |
| 2016/0174655 | A1 | 6/2016 | Schiller et al. |
| 2016/0208060 | A1 | 7/2016 | Nishiguchi et al. |
| 2016/0251535 | A1 | 9/2016 | Chaudhary et al. |
| 2017/0130876 | A1 | 5/2017 | Gopalan et al. |
| 2018/0223025 | A1 | 8/2018 | Gopalan et al. |
| 2018/0237569 | A1 | 8/2018 | Gopalan et al. |

FOREIGN PATENT DOCUMENTS

| | | |
|---|---|---|
| EP | 0944670 B1 | 4/2003 |
| EP | 1820821 A1 | 8/2007 |
| EP | 2083047 A1 | 7/2009 |
| EP | 2143984 A1 | 1/2010 |
| EP | 2407496 A1 | 1/2012 |
| EP | 2520422 A1 | 11/2012 |
| EP | 2546291 A1 | 1/2013 |
| EP | 2395878 B1 | 4/2013 |
| JP | 2013119583 A | 6/2013 |
| WO | 9001503 A1 | 2/1990 |
| WO | 2004031292 A1 | 4/2004 |
| WO | 2005005532 A1 | 1/2005 |
| WO | 2010074916 A1 | 7/2010 |
| WO | 2013134945 A1 | 9/2013 |
| WO | 2015054893 A1 | 4/2015 |
| WO | 2015126931 A1 | 8/2015 |
| WO | 2016004204 A1 | 1/2016 |

OTHER PUBLICATIONS

Adam Eugene Imel, Polymer Additives Effects on Structure and Dynamics, Aug. 2015, University of Tennessee, Knoxville, obtained from https://trace.tennessee.edu/cgi/viewcontent.cgi?referer=https://www.google.com/&httpsredir=1&article=4689&context =utk_graddiss (Year: 2015).*

Arhart, Richard J., The Chemistry of Ethylene Propylene Insulation—PartII, IEEE Electrical Insulation Magazine 9 (6), 1993, 11-14.

Adachi et al., Controllable Silane Water-Cross-Linking Kinetics and Curability of Ethylene-Propylene Copolymer by Amine Compounds, Industrial and Engineering Chemistry Research, 47, 2008, 1812-1819.

Dow Corning, Plastics, Polymerization and Rubber, 2009, 5 pages.

Morshedian et al., Polyethylene Cross-linking by Two-step Silane Method: A Review, Iranian Polymer Journal, 18 (2), 2009, 103-128.

Morshedian et al., Silane grafting of polyethylene: effect of molecular structure, physical form, blending, and antioxidants, e-Polymers, No. 24, 2009, 1-17.

Sirisinha et al., The effect of silane carriers on silane grafting of high-desity polyethylene and properties of crosslinked products, Poymer Testing 29, (2010), 958-965.

Why Use Silane Crosslinking Technology, Jun. 8, 2012, <https://wenku.baidu.com/view/3454a9a7b0717fd5360cdcb4>.

International Searching Authority, International Search Report and Written Opinion for International Application No. PCT/US2015/038830, dated Sep. 23, 2015, 12 pages.

European Patent Office, "International Search Report and the Written Opinion of the International Searching Authority," PCT Application No. PCT/US2017/065442, dated Mar. 16, 2018 (10 pages).

European Patent Office, "International Search Report and the Written Opinion of the International Searching Authority," PCT Application No. PCT/US2017/065451, dated Mar. 16, 2018 (10 pages).

European Patent Office, "International Search Report and the Written Opinion of the International Searching Authority," PCT Application No. PCT/US2017/065463, dated Mar. 16, 2018 (10 pages).

European Patent Office, "International Search Report and the Written Opinion of the International Searching Authority," PCT Application No. PCT/US2017/065360, dated Mar. 26, 2018 (11 pages).

European Patent Office, "International Search Report and the Written Opinion of the International Searching Authority," PCT Application No. PCT/US2017/065376, dated Feb. 22, 2018 (11 pages).

European Patent Office, "International Search Report and the Written Opinion of the International Searching Authority," PCT Application No. PCT/US2017/065386, dated Mar. 22, 2018 (11 pages).

European Patent Office, International Search Report and Written Opinion of the International Searching Authority, PCT Application No. PCT/US2017/065459, dated May 25, 2018 (17 pages).

European Patent Office, International Search Report and Written Opion of the International Searching Authority, PCT Application No. PCT/US2017/065404, dated Mar. 16, 2018 (10 pages).

* cited by examiner

Initiation

Propagation

Chain Transfer

Hydrolysis

Condensation/Crosslinking

ROOFING MEMBRANES, COMPOSITIONS, AND METHODS OF MAKING THE SAME

CROSS-REFERENCE TO RELATED APPLICATIONS

This application is a continuation application that claims priority to and the benefit under 35 U.S.C. §§ 119(e), 120 of the U.S. patent application Ser. No. 15/836,417, filed Dec. 8, 2017, entitled "ROOFING MEMBRANES, COMPOSITIONS, AND METHODS OF MAKING THE SAME," which claims priority under 35 U.S.C. § 119(e) to U.S. Provisional Patent Application No. 62/497,959, filed Dec. 10, 2016, entitled "HOSE, COMPOSITION INCLUDING SILANE-GRAFTED POLYOLEFIN, AND PROCESS OF MAKING A HOSE," and to U.S. Provisional Patent Application No. 62/497,954 filed Dec. 10, 2016, entitled "WEATHERSTRIP, COMPOSITION INCLUDING SILANE-GRAFTED POLYOLEFIN, AND PROCESS OF MAKING A WEATHERSTRIP," all of which are herein incorporated by reference in their entirety.

FIELD OF THE DISCLOSURE

The present disclosure generally relates to compositions that may be used to form thermoplastic roofing membranes, and more particularly, to silane-grafted polyolefin elastomer compositions used to form thermoplastic roofing membranes and methods for manufacturing these compositions and roofing membranes.

BACKGROUND OF THE DISCLOSURE

Thermoplastic roofing membranes may be a single layer or may be composed of multiple layers and may contain a reinforcing fabric or scrim reinforcement material in the center between any two of the layers of the roofing membrane. Each of the respective layers in the roofing membrane needs to demonstrate a variety of different material properties in order to be suited for use on a roof where the material will be exposed to the sun and the elements. The material properties of the polymer layers should exhibit good adhesion, UV resistance, weatherability (durability), flame retardance, flexibility, chemical resistance and longevity. In addition, roofing membranes should preferably be capable of forming hot-air welded seams.

Many different polymer systems are available to be used for roofing membranes. The most commonly used polymer systems include thermoplastic polyolefin (TPO), ethylene propylene diene monomer (EPDM), and polyvinyl chloride (PVC). Depending on the material(s) selected, different advantages and disadvantages are typically observed. TPO membranes are widely available, affordable, and typically white, but are susceptible to deterioration when exposed to high heat and/or solar UV radiation. EPDM membranes are made from the readily available EPDM synthetic rubber, but roughly 95% of all EPDM roofing membranes produced are black while federal and state building regulators are starting to push for white roofing membranes. Lastly, PVC membranes are widely available and offer excellent puncture, heat-weldability, colorability, and heat resistant qualities, but these membranes can be expensive to manufacture and suffer from variability in properties as produced by different manufacturers.

Mindful of the advantages and drawbacks for the various TPO, EPDM, and PVC materials used to make roofing membranes, manufacturers have a need for the development of new polymer compositions and methods of making roofing membranes that are simpler with less production variability, lighter in weight and color, and have superior durability over a longer period of time.

SUMMARY OF THE DISCLOSURE

According to some aspects of the present disclosure, a roofing membrane is provided. The roofing membrane comprises a top layer including a flame retardant and a first silane-crosslinked polyolefin elastomer having a density less than 1.45 g/cm$^3$; an optional scrim layer; and a bottom layer including a flame retardant and a second silane-crosslinked polyolefin elastomer having a density less than 1.45 g/cm$^3$.

According to other aspects of the present disclosure, a roofing membrane is provided. The roofing membrane includes a top layer including a flame retardant and a first silane-crosslinked polyolefin elastomer having a density less than 1.45 g/cm$^3$; a bottom layer including a flame retardant and a second silane-crosslinked polyolefin elastomer having a density less than 1.45 g/cm$^3$; and a scrim layer between, and in contact with, the top layer and the bottom layer. The first and second silane-crosslinked polyolefin elastomers each comprise a first polyolefin having a density less than 0.86 g/cm$^3$, a second polyolefin, a silane crosslinker, a grafting initiator, and a condensation catalyst.

According to still further aspects of the present disclosure, a roofing membrane including: a top layer including a flame retardant and a first silane-crosslinked polyolefin elastomer having a density less than 1.45 g/cm$^3$; a bottom layer including a flame retardant and a second silane-crosslinked polyolefin elastomer having a density less than 1.45 g/cm$^3$; and a scrim layer between, and in contact with, the top layer and the bottom layer. The first and second silane-crosslinked polyolefin elastomers each consist essentially of a first polyolefin having a density less than 0.86 g/cm$^3$, a second polyolefin, a silane crosslinker, a grafting initiator, and a condensation catalyst.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
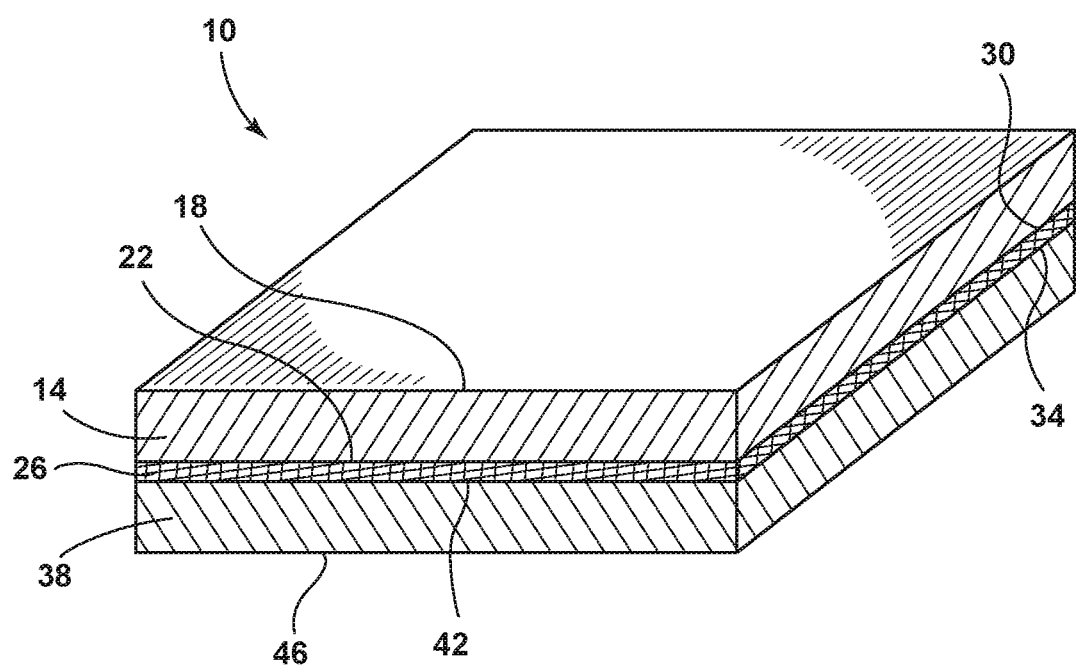
FIG. 1 is a cross-sectional view of a roofing membrane according to some aspects of the present disclosure.

For purposes of description herein the terms "upper," "lower," "right," "left," "rear," "front," "vertical," "horizontal," and derivatives thereof shall relate to the roofing membranes of the disclosure as shown in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/orvalues.

A value modified by a term or terms, such as "about" and "substantially," may not be limited to the precise value specified. The approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4."

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIG. 1, a roofing membrane 10 is disclosed. The roofing membrane 10 includes a top layer 14 having a flame retardant and a first silane-crosslinked polyolefin elastomer with a density less than 0.90 g/cm$^3$; a scrim layer 26; and a bottom layer 38 having a flame retardant and a second silane-crosslinked polyolefin elastomer with a density less than 0.90 g/cm$^3$. The top and bottom layers of the roofing membrane both exhibit a compression set of from about 5.0% to about 35.0%, as measured according to ASTM D 395 (22 hrs @ 70° C.).

A TPO roofing membrane must exhibit at least the following mechanical properties as outlined by the ASTM specification for TPO roofing membranes: 1) a tensile strength (CD and MD) greater than 10 MPa; 2) an elongation at break (CD and MD) greater than 500%; 3) an elastic modulus (CD and MD) of less than 100 MPa; and 4) a flame retardance rating of classification D as measured in accordance with the EN ISO 11925-2 surface exposure test.

Referring again to FIG. 1, a cross-sectional view of the single ply roofing membrane 10 is provided. The single ply roofing membrane 10 includes the top layer 14 with a first and a second surface 18, 22. The scrim layer 26 (also referred to as scrim 26) has a third and a fourth surface 30, 34 where the third surface 30 of the scrim 26 is coupled to the second surface 22 of the top layer 14. The single ply roofing membrane 10 additionally includes a bottom layer 38 with a fifth and a sixth surface 42, 46, where the fifth surface 42 of the bottom layer 38 is coupled to the fourth surface 34 of the scrim 26. In some aspects, the roofing membrane 10 may include the single ply roofing membrane, a double ply roofing membrane, or a higher number of plies. Unless otherwise denoted, roofing membrane 10 and single ply roofing membrane 10 both mean a single ply made from the top layer 14, scrim layer 26, and bottom layer 38.

The scrim layer 26 disposed between the top and bottom layers 14, 38 can serve as a reinforcement in the roofing membrane, thus adding to its structural integrity. Materials that can be used for the scrim layers 26 may include, for example, woven and/or non-woven fabrics, fiberglass, and/or polyester. In some aspects, additional materials that can be used for the scrim layers 26 can include synthetic materials such as polyaramids, KEVLAR™, TWARON™, polyamides, polyesters, RAYON™, NOMEX™, TECHNORA™, or a combination thereof. In some aspects, the scrim layer 26 may include aramids, polyamides, and/or polyesters. In some aspects, a tenacity of the scrim layer 26 may range from about 100 to about 3000 denier. In other aspects, the scrim layers 26 may have a tenacity ranging from about 500 to about 1500 denier. In still other aspects, scrim layers 26 may have a tenacity of about 1000 denier. In some aspects, scrim layers 26 may have a tensile strength of greater than about 14 kN per meter (80 pounds force per inch). In other aspects, the scrim layers 26 may have a tensile strength of greater than about 10 kN per meter, greater than about 15 kN per meter, greater than about 20 kN per meter, or greater than about 25 kN per meter. Depending on the desired properties of the final single ply roofing membrane 10, the scrim layers 26 may be varied as needed to suit particular roofing membrane designs. One of ordinary skill in the art would appreciate that such characteristics can be varied without departing from the present disclosure.

The single ply roofing membranes 10 disclosed herein may have a variety of different dimensions. In some aspects, single ply roofing membranes 10 may have a length from about 30 feet to about 200 feet and a width from about 4 feet to about 12 feet. In some aspects, the roofing membranes 10 may have a width of about 10 feet. Variations in the width may provide for various advantages. For example, in some aspects, roofing membranes 10 having smaller widths may advantageously allow for greater ease in assembly of a roofing structure. Smaller widths may also advantageously allow for greater ease in rolling or packaging of a manufactured membrane. Larger widths may advantageously allow for greater structure integrity, fast installation and/or improve the stability of a roofing structure comprising these membranes.

Numerous different flame retardants may be used in combination with the first and second silane-crosslinkable polyolefin elastomer employed in the top and bottom layers 14, 38 of the roofing membrane 10. For example, magnesium hydroxide may provide flame retardant properties in the layers 14, 38. Magnesium hydroxide may be extruded or blended with the silane-grafted polyolefin elastomer to ensure complete dispersal in the composition blend. In some aspects, the magnesium hydroxide is blended with the silane-grafted polyolefin elastomer in an amount up to 70 wt % magnesium hydroxide. In another exemplary embodiment, the magnesium hydroxide in the silane-grafted polyolefin elastomer can make up between about 20 wt % and 75 wt % of the roofing membrane composition.

The disclosure focuses on the composition, method of making the composition, methods of making roofing membranes with these compositions, and the corresponding material properties for the silane-crosslinked polyolefin elastomer used to make single ply roofing membranes 10 (as depicted in FIG. 1), along with other roofing membranes 10 consistent with the principles of this disclosure. The roofing membrane 10 is formed from a silane-grafted polyolefin where the silane-grafted polyolefin may have a catalyst added to form a silane-crosslinkable polyolefin elastomer. This silane-crosslinkable polyolefin may then be crosslinked upon exposure to moisture and/or heat to form the final silane-crosslinked polyolefin elastomer or blend. In aspects, the silane-crosslinked polyolefin elastomer or blend includes the first polyolefin having a density less than 0.90 g/cm$^3$, the second polyolefin having a crystallinity of less than 40%, the silane crosslinker, the graft initiator, and the condensation catalyst.

First Polyolefin

The first polyolefin can be a polyolefin elastomer including an olefin block copolymer, an ethylene/α-olefin copolymer, a propylene/α-olefin copolymer, EPDM, EPM, or a mixture of two or more of any of these materials. Exemplary block copolymers include those sold under the trade names INFUSE™, an olefin block co-polymer (the Dow Chemical Company) and SEPTON™ V-SERIES, a styrene-ethylene-butylene-styrene block copolymer (Kuraray Co., LTD.). Exemplary ethylene/α-olefin copolymers include those sold under the trade names TAFMER™ (e.g., TAFMER DF710) (Mitsui Chemicals, Inc.), and ENGAGE™ (e.g., ENGAGE 8150) (the Dow Chemical Company). Exemplary propylene/α-olefin copolymers include those sold under the trade name VISTAMAXX™ 6102 grades (Exxon Mobil Chemical Company), TAFMER™ XM (Mitsui Chemical Company), and VERSIFY™ (Dow Chemical Company). The EPDM may have a diene content of from about 0.5 to about 10 wt %. The EPM may have an ethylene content of 45 wt % to 75 wt %.

The term "comonomer" refers to olefin comonomers which are suitable for being polymerized with olefin monomers, such as ethylene or propylene monomers. Comonomers may comprise but are not limited to aliphatic $C_2$-$C_{20}$ α-olefins. Examples of suitable aliphatic $C_2$-$C_{20}$ α-olefins include ethylene, propylene, 1-butene, 4-methyl-1-pentene, 1-hexene, 1-octene, 1-decene, 1-dodecene, 1-tetradecene, 1-hexadecene, 1-octadecene and 1-eicosene. In an embodiment, the comonomer is vinyl acetate. The term "copolymer" refers to a polymer, which is made by linking more than one type of monomer in the same polymer chain. The term "homopolymer" refers to a polymer which is made by linking olefin monomers, in the absence of comonomers. The amount of comonomer can, in some embodiments, be from greater than 0 wt % to about 12 wt % based on the weight of the polyolefin, including from greater than 0 wt % to about 9 wt %, and from greater than 0 wt % to about 7 wt %. In some embodiments, the comonomer content is greater than about 2 mol % of the final polymer, including greater than about 3 mol % and greater than about 6 mol %. The comonomer content may be less than or equal to about 30 mol %. A copolymer can be a random or block (heterophasic) copolymer. In some embodiments, the polyolefin is a random copolymer of propylene and ethylene.

In some aspects, the first polyolefin is selected from the group consisting of: an olefin homopolymer, a blend of homopolymers, a copolymer made using two or more olefins, a blend of copolymers each made using two or more olefins, and a combination of olefin homopolymers blended with copolymers made using two or more olefins. The olefin may be selected from ethylene, propylene, 1-butene, 1-propene, 1-hexene, 1-octene, and other higher 1-olefin. The first polyolefin may be synthesized using many different processes (e.g., using gas phase and solution based metallocene catalysis and Ziegler-Natta catalysis) and optionally using a catalyst suitable for polymerizing ethylene and/or α-olefins. In some aspects, a metallocene catalyst may be used to produce low density ethylene/α-olefin polymers.

In some aspects, the polyethylene used for the first polyolefin can be classified into several types including, but not limited to, LDPE (Low Density Polyethylene), LLDPE (Linear Low Density Polyethylene), and HDPE (High Density Polyethylene). In other aspects, the polyethylene can be classified as Ultra High Molecular Weight (UHMW), High Molecular Weight (HMW), Medium Molecular Weight (MMW) and Low Molecular Weight (LMW). In still other aspects, the polyethylene may be an ultra-low density ethylene elastomer.

In some aspects, the first polyolefin may include a LDPE/silane copolymer or blend. In other aspects, the first polyolefin may be polyethylene that can be produced using any catalyst known in the art including, but not limited to, chromium catalysts, Ziegler-Natta catalysts, metallocene catalysts or post-metallocene catalysts.

In some aspects, the first polyolefin may have a molecular weight distribution $M_w/M_n$ of less than or equal to about 5, less than or equal to about 4, from about 1 to about 3.5, or from about 1 to about 3.

The first polyolefin may be present in an amount of from greater than 0 to about 100 wt % of the composition. In some embodiments, the amount of polyolefin elastomer is from about 30 wt % to about 70 wt %. In some aspects, the first polyolefin fed to an extruder can include from about 50 wt % to about 80 wt % of an ethylene/α-olefin copolymer, including from about 60 wt % to about 75 wt %, and from about 62 wt % to about 72 wt %.

The first polyolefin may have a melt viscosity in the range of from about 2,000 cP to about 50,000 cP as measured using a Brookfield viscometer at a temperature of about 177° C. In some embodiments, the melt viscosity is from about 4,000 cP to about 40,000 cP, including from about 5,000 cP to about 30,000 cP and from about 6,000 cP to about 18,000 cP.

The first polyolefin may have a melt index (T2), measured at 190° C. under a 2.16 kg load, of from about 20.0 g/10 min to about 3,500 g/10 min, including from about 250 g/10 min to about 1,900 g/10 min and from about 300 g/10 min to about 1,500 g/10 min. In some aspects, the first polyolefin has a fractional melt index of from 0.5 g/10 min to about 3,500 g/10 min.

In some aspects, the density of the first polyolefin is less than 0.90 g/cm$^3$, less than about 0.89 g/cm$^3$, less than about 0.88 g/cm$^3$, less than about 0.87 g/cm$^3$, less than about 0.86 g/cm$^3$, less than about 0.85 g/cm$^3$, less than about 0.84 g/cm$^3$, less than about 0.83 g/cm$^3$, less than about 0.82 g/cm$^3$, less than about 0.81 g/cm$^3$, or less than about 0.80 g/cm³. In other aspects, the density of the first polyolefin may be from about 0.85 g/cm³ to about 0.89 g/cm³, from about 0.85 g/cm³ to about 0.88 g/cm³, from about 0.84 g/cm³ to about 0.88 g/cm³, or from about 0.83 g/cm³ to about 0.87 g/cm³. In still other aspects, the density is at about 0.84 g/cm³, about 0.85 g/cm³, about 0.86 g/cm³, about 0.87 g/cm³, about 0.88 g/cm³, or about 0.89 g/cm³.

The percent crystallinity of the first polyolefin may be less than about 60%, less than about 50%, less than about 40%, less than about 35%, less than about 30%, less than about 25%, or less than about 20%. The percent crystallinity may be at least about 10%. In some aspects, the crystallinity is in the range of from about 2% to about 60%.

Second Polyolefin

The second polyolefin can be a polyolefin elastomer including an olefin block copolymer, an ethylene/α-olefin copolymer, a propylene/α-olefin copolymer, EPDM, EPM, or a mixture of two or more of any of these materials. Exemplary block copolymers include those sold under the trade names INFUSE™ (the Dow Chemical Company) and SEPTON™ V-SERIES (Kuraray Co., LTD.). Exemplary ethylene/α-olefin copolymers include those sold under the trade names TAFMER™ (e.g., TAFMER DF710) (Mitsui Chemicals, Inc.) and ENGAGE™ (e.g., ENGAGE 8150) (the Dow Chemical Company). Exemplary propylene/α-olefin copolymers include those sold under the trade name TAFMER™ XM grades (Mitsui Chemical Company) and VISTAMAXX™ (e.g., VISTAMAXX 6102) (Exxon Mobil Chemical Company). The EPDM may have a diene content of from about 0.5 to about 10 wt %. The EPM may have an ethylene content of 45 wt % to 75 wt %.

In some aspects, the second polyolefin is selected from the group consisting of: an olefin homopolymer, a blend of homopolymers, a copolymer made using two or more olefins, a blend of copolymers each made using two or more olefins, and a blend of olefin homopolymers with copolymers made using two or more olefins. The olefin may be selected from ethylene, propylene, 1-butene, 1-propene, 1-hexene, 1-octene, and other higher 1-olefin. The first polyolefin may be synthesized using many different processes (e.g., using gas phase and solution based metallocene catalysis and Ziegler-Natta catalysis) and optionally using a catalyst suitable for polymerizing ethylene and/or α-olefins. In some aspects, a metallocene catalyst may be used to produce low density ethylene/α-olefin polymers.

In some aspects, the second polyolefin may include a polypropylene homopolymer, a polypropylene copolymer, a polyethylene-co-propylene copolymer, or a mixture thereof. Suitable polypropylenes include but are not limited to polypropylene obtained by homopolymerization of propylene or copolymerization of propylene and an α-olefin comonomer. In some aspects, the second polyolefin may have a higher molecular weight and/or a higher density than the first polyolefin.

In some embodiments, the second polyolefin may have a molecular weight distribution $M_w/M_n$ of less than or equal to about 5, less than or equal to about 4, from about 1 to about 3.5, or from about 1 to about 3.

The second polyolefin may be present in an amount of from greater than 0 wt % to about 100 wt % of the composition. In some embodiments, the amount of polyolefin elastomer is from about 30 wt % to about 70 wt %. In some embodiments, the second polyolefin fed to the extruder can include from about 10 wt % to about 50 wt % polypropylene, from about 20 wt % to about 40 wt % polypropylene, or from about 25 wt % to about 35 wt % polypropylene. The polypropylene may be a homopolymer or a copolymer.

The second polyolefin may have a melt viscosity in the range of from about 2,000 cP to about 50,000 cP as measured using a Brookfield viscometer at a temperature of about 177° C. In some embodiments, the melt viscosity is from about 4,000 cP to about 40,000 cP, including from about 5,000 cP to about 30,000 cP and from about 6,000 cP to about 18,000 cP.

The second polyolefin may have a melt index (T2), measured at 190° C. under a 2.16 kg load, of from about 20.0 g/10 min to about 3,500 g/10 min, including from about 250 g/10 min to about 1,900 g/10 min and from about 300 g/10 min to about 1,500 g/10 min. In some embodiments, the polyolefin has a fractional melt index of from 0.5 g/10 min to about 3,500 g/10 min.

In some aspects, the density of the second polyolefin is less than 0.90 g/cm³, less than about 0.89 g/cm³, less than about 0.88 g/cm³, less than about 0.87 g/cm³, less than about 0.86 g/cm³, less than about 0.85 g/cm³, less than about 0.84 g/cm³, less than about 0.83 g/cm³, less than about 0.82 g/cm³, less than about 0.81 g/cm³, or less than about 0.80 g/cm³. In other aspects, the density of the first polyolefin may be from about 0.85 g/cm³ to about 0.89 g/cm³, from about 0.85 g/cm³ to about 0.88 g/cm³, from about 0.84 g/cm³ to about 0.88 g/cm³, or from about 0.83 g/cm³ to about 0.87 g/cm³. In still other aspects, the density is at about 0.84 g/cm³, about 0.85 g/cm³, about 0.86 g/cm³, about 0.87 g/cm³, about 0.88 g/cm³, or about 0.89 g/cm³.

The percent crystallinity of the second polyolefin may be less than about 60%, less than about 50%, less than about 40%, less than about 35%, less than about 30%, less than about 25%, or less than about 20%. The percent crystallinity may be at least about 10%. In some aspects, the crystallinity is in the range of from about 2% to about 60%.

As noted, the silane-crosslinked polyolefin elastomers or blends, e.g., as employed in roofing membranes 10 (e.g., within the top and bottom layers 14, 38 as shown in FIG. 1), includes both the first polyolefin and the second polyolefin. The second polyolefin is generally used to modify the hardness and/or processability of the first polyolefin having a density less than 0.90 g/cm³. In some aspects, more than just the first and second polyolefins may be used to form the silane-crosslinked polyolefin elastomer or blend. For example, in some aspects, one, two, three, four, or more different polyolefins having a density less than 0.90 g/cm³, less than 0.89 g/cm³, less than 0.88 g/cm³, less than 0.87 g/cm³, less than 0.86 g/cm³, or less than 0.85 g/cm³ may be substituted and/or used for the first polyolefin. In some aspects, one, two, three, four, or more different polyolefins, polyethylene-co-propylene copolymers may be substituted and/or used for the second polyolefin.

The blend of the first polyolefin having a density less than 0.90 g/cm³ and the second polyolefin having a crystallinity less than 40% is used because the subsequent silane grafting and crosslinking of these first and second polyolefin materials together are what form the core resin structure in the final silane-crosslinked polyolefin elastomer. Although additional polyolefins may be added to the blend of the silane-grafted, silane-crosslinkable, and/or silane-crosslinked polyolefin elastomer as fillers to improve and/or modify the Young's modulus as desired for the final product, any polyolefins added to the blend having a crystallinity equal to or greater than 40% are not chemically or covalently incorporated into the crosslinked structure of the final silane-crosslinked polyolefin elastomer.

In some aspects, the first and second polyolefins may further include one or more TPVs and/or EPDM with or without silane graft moieties where the TPV and/or EPDM polymers are present in an amount of up to 20 wt % of the silane-crosslinker polyolefin elastomer/blend.

Grafting Initiator

A grafting initiator (also referred to as "a radical initiator" in the disclosure) can be utilized in the grafting process of at least the first and second polyolefins by reacting with the respective polyolefins to form a reactive species that can react and/or couple with the silane crosslinker molecule. The grafting initiator can include halogen molecules, azo compounds (e.g., azobisisobutyl), carboxylic peroxyacids, peroxyesters, peroxyketals, and peroxides (e.g., alkyl hydroperoxides, dialkyl peroxides, and diacyl peroxides). In some embodiments, the grafting initiator is an organic peroxide selected from di-t-butyl peroxide, t-butyl cumyl peroxide, dicumyl peroxide, 2,5-dimethyl-2,5-di(t-butyl-peroxy) hexyne-3,1,3-bis(t-butyl-peroxy-isopropyl)benzene, n-butyl-4,4-bis(t-butyl-peroxy)valerate, benzoyl peroxide, t-butylperoxybenzoate, t-butylperoxy isopropyl carbonate, and t-butylperbenzoate, as well as bis(2-methylbenzoyl) peroxide, bis(4-methylbenzoyl)peroxide, t-butyl peroctoate, cumene hydroperoxide, methyl ethyl ketone peroxide, lauryl peroxide, tert-butyl peracetate, di-t-amyl peroxide, t-amyl peroxybenzoate, 1,1-bis(t-butylperoxy)-3,3,5-trimethylcyclohexane, α,α'-bis(t-butylperoxy)-1,3-diisopropylbenzene, α,α'-bis(t-butylpexoxy)-1,4-diisopropylbenzene, 2,5-bis(t-butylperoxy)-2,5-dimethylhexane, and 2,5-bis(t-butylperoxy)-2,5-dimethyl-3-hexyne and 2,4-dichlorobenzoyl peroxide. Exemplary peroxides include those sold under the tradename LUPEROX™ (available from Arkema, Inc.).

In some aspects, the grafting initiator is present in an amount of from greater than 0 wt % to about 2 wt % of the composition, including from about 0.15 wt % to about 1.2 wt % of the composition. The amount of initiator and silane employed may affect the final structure of the silane grafted polymer (e.g., the degree of grafting in the grafted polymer and the degree of crosslinking in the cured polymer). In some aspects, the reactive composition contains at least 100 ppm of initiator, or at least 300 ppm of initiator. The initiator may be present in an amount from 300 ppm to 1500 ppm or from 300 ppm to 2000 ppm. The silane:initiator weight ratio may be from about 20:1 to 400:1, including from about 30:1 to about 400:1, from about 48:1 to about 350:1, and from about 55:1 to about 333:1.

The grafting reaction can be performed under conditions that optimize grafts onto the interpolymer backbone while minimizing side reactions (e.g., the homopolymerization of the grafting agent). The grafting reaction may be performed in a melt, in solution, in a solid-state, and/or in a swollen-state. The silanation may be performed in a wide-variety of equipment (e.g., twin screw extruders, single screw extruders, Brabenders, internal mixers such as Banbury mixers, and batch reactors). In some embodiments, the polyolefin, silane, and initiator are mixed in the first stage of an extruder. The melt temperature (i.e., the temperature at which the polymer starts melting and begins to flow) may be from about 120° C. to about 260° C., including from about 130° C. to about 250° C.

Silane Crosslinker

A silane crosslinker can be used to covalently graft silane moieties onto the first and second polyolefins and the silane crosslinker may include alkoxysilanes, silazanes, siloxanes, or a combination thereof. The grafting and/or coupling of the various potential silane crosslinkers or silane crosslinker molecules is facilitated by the reactive species formed by the grafting initiator reacting with the respective silane crosslinker.

In some aspects, the silane crosslinker is a silazane where the silazane may include, for example, hexamethyldisilazane (HMDS) or Bis(trimethylsilyl)amine. In some aspects, the silane crosslinker is a siloxane where the siloxane may include, for example, polydimethylsiloxane (PDMS) and octamethylcyclotetrasiloxane.

In some aspects, the silane crosslinker is an alkoxysilane. As used herein, the term "alkoxysilane" refers to a compound that comprises a silicon atom, at least one alkoxy group and at least one other organic group, wherein the silicon atom is bonded with the organic group by a covalent bond. Preferably, the alkoxysilane is selected from alkylsilanes; acryl-based silanes; vinyl-based silanes; aromatic silanes; epoxy-based silanes; amino-based silanes and amines that possess —NH$_2$, —NHCH$_3$ or —N(CH$_3$)$_2$; ureide-based silanes; mercapto-based silanes; and alkoxysilanes which have a hydroxyl group (i.e., —OH). An acryl-based silane may be selected from the group comprising beta-acryloxyethyl trimethoxysilane; beta-acryloxy propyl trimethoxysilane; gamma-acryloxyethyl trimethoxysilane; gamma-acryloxypropyl trimethoxysilane; beta-acryloxyethyl triethoxysilane; beta-acryloxypropyl triethoxysilane; gamma-acryloxyethyl triethoxysilane; gamma-acryloxypropyl triethoxysilane; beta-methacryloxyethyl trimethoxysilane; beta-methacryloxypropyl trimethoxysilane; gamma-methacryloxyethyl trimethoxysilane; gamma-methacryloxypropyl trimethoxysilane; beta-methacryloxyethyl triethoxysilane; beta-methacryloxypropyl triethoxysilane; gamma-methacryloxyethyl triethoxysilane; gamma-methacryloxypropyl triethoxysilane; 3-methacryloxypropylmethyl diethoxysilane. A vinyl-based silane may be selected from the group comprising vinyl trimethoxysilane; vinyl triethoxysilane; p-styryl trimethoxysilane, methylvinyldimethoxysilane, vinyldimethylmethoxysilane, divinyldimethoxysilane, vinyltris(2-methoxyethoxy)silane, and vinylbenzylethylenediaminopropyltrimethoxysilane. An aromatic silane may be selected from phenyltrimethoxysilane and phenyltriethoxysilane. An epoxy-based silane may be selected from the group comprising 3-glycydoxypropyl trimethoxysilane; 3-glycydoxypropylmethyl diethoxysilane; 3-glycydoxypropyl triethoxysilane; 2-(3,4-epoxycyclohexyl)ethyl trimethoxysilane, and glycidyloxypropylmethyldimethoxysilane. An amino-based silane may be selected from the group comprising 3-aminopropyl triethoxysilane; 3-aminopropyl trimethoxysilane; 3-aminopropyldimethyl ethoxysilane; 3-aminopropylmethyldiethoxysilane; 4-aminobutyltriethoxysilane; 3-aminopropyldiisopropyl ethoxysilane; 1-amino-2-(dimethylethoxysilyl)propane; (aminoethylamino)-3-isobutyldimethyl methoxysilane; N-(2-aminoethyl)-3-aminoisobutylmethyl dimethoxysilane; (aminoethylaminomethyl)phenetyl trimethoxysilane; N-(2-aminoethyl)-3-aminopropylmethyl dimethoxysilane; N-(2-aminoethyl)-3-aminopropyl trimethoxysilane; N-(2-aminoethyl)-3-aminopropyl triethoxysilane; N-(6-aminohexyl) aminomethyl trimethoxysilane; N-(6-aminohexyl) aminomethyl trimethoxysilane; N-(6-aminohexyl) aminopropyl trimethoxysilane; N-(2-aminoethyl)-1,1-aminoundecyl trimethoxysilane; 1,1-aminoundecyl triethoxysilane; 3-(m-aminophenoxy)propyl trimethoxysilane; m-aminophenyl trimethoxysilane; p-aminophenyl trimethoxysilane; (3-trimethoxysilylpropyl)diethylenetriamine; N-methylaminopropylmethyl dimethoxysilane;

N-methylaminopropyl trimethoxysilane; dimethylaminomethyl ethoxysilane; (N,N-dimethylaminopropyl)trimethoxysilane; (N-acetylglycysil)-3-aminopropyl trimethoxysilane, N-phenyl-3-aminopropyltrimethoxysilane, N-phenyl-3-aminopropyltriethoxysilane, phenylaminopropyltrimethoxysilane, aminoethylaminopropyltrimethoxysilane, and aminoethylaminopropylmethyldimethoxysilane. An ureide-based silane may be 3-ureidepropyl triethoxysilane. A mercapto-based silane may be selected from the group comprising 3-mercaptopropylmethyl dimethoxysilane, 3-mercaptopropyl trimethoxysilane, and 3-mercaptopropyl triethoxysilane. An alkoxysilane having a hydroxyl group may be selected from the group comprising hydroxymethyl triethoxysilane; N-(hydroxyethyl)-N-methylaminopropyl trimethoxysilane; bis(2-hydroxyethyl)-3-aminopropyl triethoxysilane; N-(3-triethoxysilylpropyl)-4-hydroxy butylamide; 1,1-(triethoxysilyl) undecanol; triethoxysilyl undecanol; ethylene glycol acetal; and N-(3-ethoxysilylpropyl)gluconamide.

In some aspects, the alkylsilane may be expressed with a general formula: $R_nSi(OR')_{4-n}$ wherein: n is 1, 2 or 3; R is a $C_{1-20}$ alkyl or a $C_{2-20}$ alkenyl; and R' is an $C_{1-20}$ alkyl. The term "alkyl" by itself or as part of another substituent, refers to a straight, branched or cyclic saturated hydrocarbon group joined by single carbon-carbon bonds having 1 to 20 carbon atoms, for example 1 to 10 carbon atoms, for example 1 to 8 carbon atoms, preferably 1 to 6 carbon atoms. When a subscript is used herein following a carbon atom, the subscript refers to the number of carbon atoms that the named group may contain. Thus, for example, $C_{1-6}$ alkyl means an alkyl of one to six carbon atoms. Examples of alkyl groups are methyl, ethyl, propyl, isopropyl, butyl, isobutyl, sec-butyl, f-butyl, 2-methylbutyl, pentyl, iso-amyl and its isomers, hexyl and its isomers, heptyl and its isomers, octyl and its isomer, decyl and its isomer, dodecyl and its isomers. The term "$C_{2-20}$alkenyl" by itself or as part of another substituent, refers to an unsaturated hydrocarbyl group, which may be linear, or branched, comprising one or more carbon-carbon double bonds having 2 to 20 carbon atoms. Examples of $C_{2-6}$ alkenyl groups are ethenyl, 2-propenyl, 2-butenyl, 3-butenyl, 2-pentenyl and its isomers, 2-hexenyl and its isomers, 2,4-pentadienyl and the like.

In some aspects, the alkylsilane may be selected from the group comprising methyltrimethoxysilane; methyltriethoxysilane; ethyltrimethoxysilane; ethyltriethoxysilane; propyltrimethoxysilane; propyltriethoxysilane; hexyltrimethoxysilane; hexyltriethoxysilane; octyltrimethoxysilane; octyltriethoxysilane; decyltrimethoxysilane; decyltriethoxysilane; dodecyltrimethoxysilane: dodecyltriethoxysilane; tridecyltrimethoxysilane; dodecyltriethoxysilane; hexadecyltrimethoxysilane; hexadecyltriethoxysilane; octadecyltrimethoxysilane; octadecyltriethoxysilane, trimethylmethoxysilane, methylhydrodimethoxysilane, dimethyldimethoxysilane, diisopropyldimethoxysilane, diisobutyldimethoxysilane, isobutyltrimethoxysilane, n-butyltrimethoxysilane, n-butylmethyldimethoxysilane, phenyltrimethoxysilane, phenyltrimethoxysilane, phenylmethyldimethoxysilane, triphenylsilanol, n-hexyltrimethoxysilane, n-octyltrimethoxysilane, isooctyltrimethoxysilane, decyltrimethoxysilane, hexadecyltrimethoxysilane, cyclohexylmethyldimethoxysilane, cyclohexylethyldimethoxysilane, dicyclopentyldimethoxysilane, tert-butylethyldimethoxysilane, tert-butylpropyldimethoxysilane, dicyclohexyldimethoxysilane, and a combination thereof.

In some aspects, the alkylsilane compound may be selected from triethoxyoctylsilane, trimethoxyoctylsilane, and a combination thereof.

Additional examples of silanes that can be used as silane crosslinkers include, but are not limited to, those of the general formula $CH_2=CR-(COO)_x(C_nH_{2n})_ySiR'_3$, wherein R is a hydrogen atom or methyl group; x is 0 or 1; y is 0 or 1; n is an integer from 1 to 12; each R' can be an organic group and may be independently selected from an alkoxy group having from 1 to 12 carbon atoms (e.g., methoxy, ethoxy, butoxy), aryloxy group (e.g., phenoxy), araloxy group (e.g., benzyloxy), aliphatic acyloxy group having from 1 to 12 carbon atoms (e.g., formyloxy, acetyloxy, propanoyloxy), amino or substituted amino groups (e.g., alkylamino, arylamino), or a lower alkyl group having 1 to 6 carbon atoms. x and y may both equal 1. In some aspects, no more than one of the three R' groups is an alkyl. In other aspects, not more than two of the three R' groups is an alkyl.

Any silane or mixture of silanes known in the art that can effectively graft to and crosslink an olefin polymer can be used in the practice of the present disclosure. In some aspects, the silane crosslinker can include, but is not limited to, unsaturated silanes which include an ethylenically unsaturated hydrocarbyl group (e.g., a vinyl, allyl, isopropenyl, butenyl, cyclohexenyl or a gamma-(meth)acryloxy allyl group) and a hydrolyzable group (e.g., a hydrocarbyloxy, hydrocarbonyloxy, or hydrocarbylamino group). Non-limiting examples of hydrolyzable groups include, but are not limited to, methoxy, ethoxy, formyloxy, acetoxy, proprionyloxy, and alkyl, or arylamino groups. In other aspects, the silane crosslinkers are unsaturated alkoxy silanes which can be grafted onto the polymer. In still other aspects, additional exemplary silane crosslinkers include vinyltrimethoxysilane, vinyltriethoxysilane, 3-(trimethoxysilyl) propyl methacrylate gamma-(meth)acryloxypropyl trimethoxysilane), and mixtures thereof.

The silane crosslinker may be present in the silane-grafted polyolefin elastomer in an amount of from greater than 0 wt % to about 10 wt %, including from about 0.5 wt % to about 5 wt %. The amount of silane crosslinker may be varied based on the nature of the olefin polymer, the silane itself, the processing conditions, the grafting efficiency, the application, and other factors. The amount of silane crosslinker may be at least 2 wt %, including at least 4 wt % or at least 5 wt %, based on the weight of the reactive composition. In other aspects, the amount of silane crosslinker may be at least 10 wt %, based on the weight of the reactive composition. In still other aspects, the silane crosslinker content is at least 1% based on the weight of the reactive composition. In some embodiments, the silane crosslinker fed to the extruder may include from about 0.5 wt % to about 10 wt % of silane monomer, from about 1 wt % to about 5 wt % silane monomer, or from about 2 wt % to about 4 wt % silane monomer.

Condensation Catalyst

A condensation catalyst can facilitate both the hydrolysis and subsequent condensation of the silane grafts on the silane-grafted polyolefin elastomer to form crosslinks. In some aspects, the crosslinking can be aided by the use of an electron beam radiation. In some aspects, the condensation catalyst can include, for example, organic bases, carboxylic acids, and organometallic compounds (e.g., organic titanates and complexes or carboxylates of lead, cobalt, iron, nickel, zinc, and tin). In other aspects, the condensation catalyst can include fatty acids and metal complex compounds such as metal carboxylates; aluminum triacetyl acetonate, iron tri-acetyl acetonate, manganese tetraacetyl acetonate, nickel tetraacetyl acetonate, chromium hexaacetyl acetonate, titanium tetraacetyl acetonate and cobalt tetraacetyl acetonate;

metal alkoxides such as aluminum ethoxide, aluminum propoxide, aluminum butoxide, titanium ethoxide, titanium propoxide and titanium butoxide; metal salt compounds such as sodium acetate, tin octylate, lead octylate, cobalt octylate, zinc octylate, calcium octylate, lead naphthenate, cobalt naphthenate, dibutyltin dioctoate, dibutyltin dilaurate, dibutyltin maleate and dibutyltin di(2-ethylhexanoate); acidic compounds such as formic acid, acetic acid, propionic acid, p-toluenesulfonic acid, trichloroacetic acid, phosphoric acid, monoalkylphosphoric acid, dialkylphosphoric acid, phosphate ester of p-hydroxyethyl (meth)acrylate, monoalkylphosphorous acid and dialkylphosphorous acid; acids such as p-toluenesulfonic acid, phthalic anhydride, benzoic acid, benzenesulfonic acid, dodecylbenzenesulfonic acid, formic acid, acetic acid, itaconic acid, oxalic acid and maleic acid, ammonium salts, lower amine salts or polyvalent metal salts of these acids, sodium hydroxide, lithium chloride; organometal compounds such as diethyl zinc and tetra(n-butoxy)titanium; and amines such as dicyclohexylamine, triethylamine, N,N-dimethylbenzylamine, N,N,NT,NT-tetramethyl-1,3-butanediamine, diethanolamine, triethanolamine and cyclohexylethylamine. In still other aspects, the condensation catalyst can include ibutyltindilaurate, dioctyltinmaleate, dibutyltindiacetate, dibutyltindioctoate, stannous acetate, stannous octoate, lead naphthenate, zinc caprylate, and cobalt naphthenate. Depending on the desired final material properties of the silane-crosslinked polyolefin elastomer or blend, a single condensation catalyst or a mixture of condensation catalysts may be utilized. The condensation catalyst(s) may be present in an amount of from about 0.01 wt % to about 1.0 wt %, including from about 0.25 wt % to about 8 wt %, based on the total weight of the silane-grafted polyolefin elastomer/blend composition.

In some aspects, a crosslinking system can include and use one or all of a combination of radiation, heat, moisture, and additional condensation catalyst. In some aspects, the condensation catalyst may be present in an amount of from 0.25 wt % to 8 wt %. In other aspects, the condensation catalyst may be included in an amount of from about 1 wt % to about 10 wt % or from about 2 wt % to about 5 wt %.

Optional Additional Components

The silane-crosslinked polyolefin elastomer may optionally include one or more fillers.

The filler(s) may be extruded with the silane-grafted polyolefin and in some aspects may include additional polyolefins having a crystallinity greater than 20%, greater than 30%, greater than 40%, or greater than 50%. In some aspects, the filler(s) may include metal oxides, metal hydroxides, metal carbonates, metal sulfates, metal silicates, clays, talcs, carbon black, and silicas. Depending on the application and/or desired properties, these materials may be fumed or calcined.

With further regard to the fillers, the metal of the metal oxide, metal hydroxide, metal carbonate, metal sulfate, or metal silicate may be selected from alkali metals (e.g., lithium, sodium, potassium, rubidium, caesium, and francium); alkaline earth metals (e.g., beryllium, magnesium, calcium, strontium, barium, and radium); transition metals (e.g., zinc, molybdenum, cadmium, scandium, titanium, vanadium, chromium, manganese, iron, cobalt, nickel, copper, yttrium, zirconium, niobium, technetium, ruthernium, rhodium, palladium, silver, hafnium, taltalum, tungsten, rhenium, osmium, indium, platinum, gold, mercury, rutherfordium, dubnium, seaborgium, bohrium, hassium, and copernicium); post-transition metals (e.g., aluminum, gallium, indium, tin, thallium, lead, bismuth, and polonium); lanthanides (e.g., lanthanum, cerium, praseodymium, neodymium, promethium, samarium, europium, gadolinium, terbium, dysprosium, holmium, erbium, thulium, ytterbium, and lutetium); actinides (e.g., actinium, thorium, protactinium, uranium, *neptunium*, plutonium, americium, curium, berkelium, californium, einsteinium, fermium, mendelevium, nobelium, and lawrencium); germanium; arsenic; antimony; and astatine.

The filler(s) of the silane-crosslinked polyolefin elastomer or blend may be present in an amount of from greater than 0 wt % to about 50 wt %, including from about 1 wt % to about 20 wt %, and from about 3 wt % to about 10 wt %.

The silane-crosslinked polyolefin elastomer and/or the respective articles formed (e.g., single ply roofing membranes 10 as depicted in FIG. 1) may also include waxes (e.g., paraffin waxes, microcrystalline waxes, HDPE waxes, LDPE waxes, thermally degraded waxes, byproduct polyethylene waxes, optionally oxidized Fischer-Tropsch waxes, and functionalized waxes). In some embodiments, the wax (es) are present in an amount of from about 0 wt % to about 10 wt %.

Tackifying resins (e.g., aliphatic hydrocarbons, aromatic hydrocarbons, modified hydrocarbons, terpens, modified terpenes, hydrogenated terpenes, rosins, rosin derivatives, hydrogenated rosins, and mixtures thereof) may also be included in the silane-crosslinker polyolefin elastomer/blend. The tackifying resins may have a ring and ball softening point in the range of from 70° C. to about 150° C. and a viscosity of less than about 3,000 cP at 177° C. In some aspects, the tackifying resin(s) are present in an amount of from about 0 wt % to about 10 wt %.

In some aspects, the silane-crosslinker polyolefin elastomer may include one or more oils. Non-limiting types of oils include white mineral oils and naphthenic oils. In some embodiments, the oil(s) are present in an amount of from about 0 wt % to about 10 wt %.

In some aspects, the silane-crosslinked polyolefin elastomer may include one or more filler polyolefins having a crystallinity greater than 20%, greater than 30%, greater than 40%, or greater than 50%. The filler polyolefin may include polypropylene, poly(ethylene-co-propylene), and/or other ethylene/α-olefin copolymers. In some aspects, the use of the filler polyolefin may be present in an amount of from about 5 wt % to about 60 wt %, from about 10 wt % to about 50 wt %, from about 20 wt % to about 40 wt %, or from about 5 wt % to about 20 wt %. The addition of the filler polyolefin may increase the Young's modulus by at least 10%, by at least 25%, or by at least 50% for the final silane-crosslinked polyolefin elastomer.

In some aspects, the silane-crosslinker polyolefin elastomer of the present disclosure may include one or more stabilizers (e.g., antioxidants). The silane-crosslinked polyolefin elastomer may be treated before grafting, after grafting, before crosslinking, and/or after crosslinking. Other additives may also be included. Non-limiting examples of additives include antistatic agents, dyes, pigments, UV light absorbers, nucleating agents, fillers, slip agents, plasticizers, fire retardants, lubricants, processing aides, smoke inhibitors, anti-blocking agents, and viscosity control agents. The antioxidant(s) may be present in an amount of less than 0.5 wt %, including less than 0.2 wt % of the composition.

In some aspects, titanium dioxide, a white pigment, may be added to the formulation to provide opacity and color. In addition, the titanium dioxide also may provide ultraviolet light protection. In some aspects, the titanium dioxide may be pre-blended with the first and/or second polyolefins (of the type set forth above) to ensure complete dispersal of the titanium dioxide throughout the composition. In some aspects, to ensure complete dispersal of the titanium dioxide into the composition prior to extrusion or other formation techniques, the titanium dioxide may be pre-blended with the first and/or second polyolefins in an amount up to 30 wt %, up to 20 wt %, or up to 10 wt %.

Method for Making the Silane-Grafted Polyolefin Elastomer

The synthesis/production of the silane-crosslinked polyolefin elastomer may be performed by combining the respective components in one extruder using a single-step Monosil process or in two extruders using a two-step Sioplas process, which eliminates the need for additional steps of mixing and shipping rubber compounds prior to extrusion.

Figure 2:
FIG. 2 is a schematic reaction pathway used to produce a silane-crosslinked polyolefin elastomer according to some aspects of the present disclosure.
Figure 2:
Figure 2:
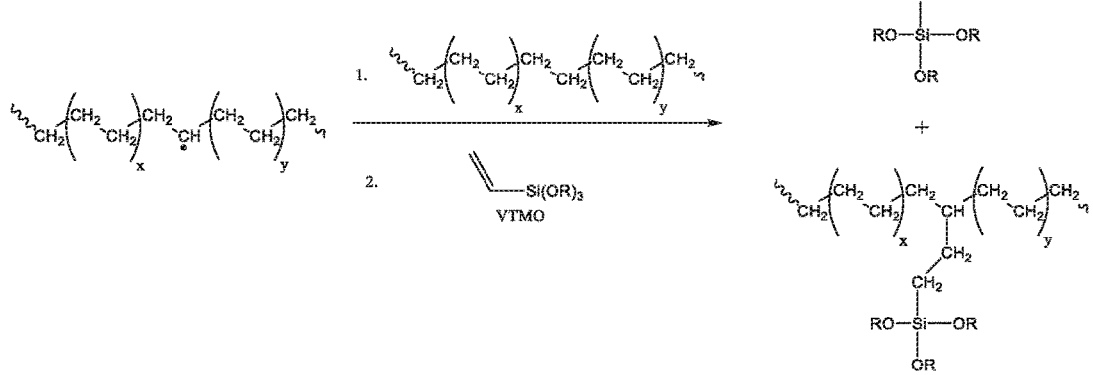
Figure 2:
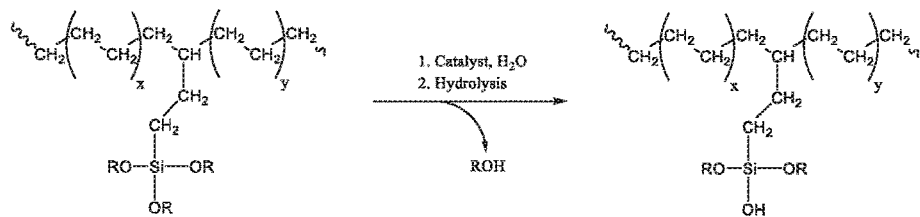
Figure 2:
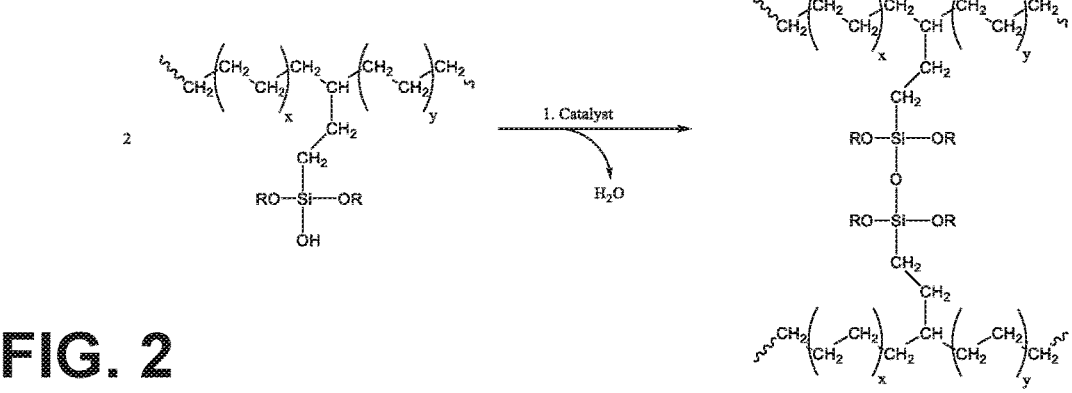

Referring now to FIG. 2, the general chemical process used during both the single-step Monosil process and two-step Sioplas process used to synthesize the silane-crosslinked polyolefin elastomer is provided. The process starts with a grafting step that includes initiation from a grafting initiator followed by propagation and chain transfer with the first and second polyolefins. The grafting initiator, in some aspects a peroxide or azo compound, homolytically cleaves to form two radical initiator fragments that transfer to one of the first and second polyolefins chains through a propagation step. The free radical, now positioned on the first or second polyolefin chain, can then transfer to a silane molecule and/or another polyolefin chain. Once the initiator and free radicals are consumed, the silane grafting reaction for the first and second polyolefins is complete.

Still referring to FIG. 2, once the silane grafting reaction is complete, a mixture of stable first and second silane-grafted polyolefins is produced. A crosslinking catalyst may then be added to the first and second silane-grafted polyolefins to form the silane-grafted polyolefin elastomer. The crosslinking catalyst may first facilitate the hydrolysis of the silyl group grafted onto the polyolefin backbones to form reactive silanol groups. The silanol groups may then react with other silanol groups on other polyolefin molecules to form a crosslinked network of elastomeric polyolefin polymer chains linked together through siloxane linkages. The density of silane crosslinks throughout the silane-grafted polyolefin elastomer can influence the material properties exhibited by the elastomer.

Figure 3:
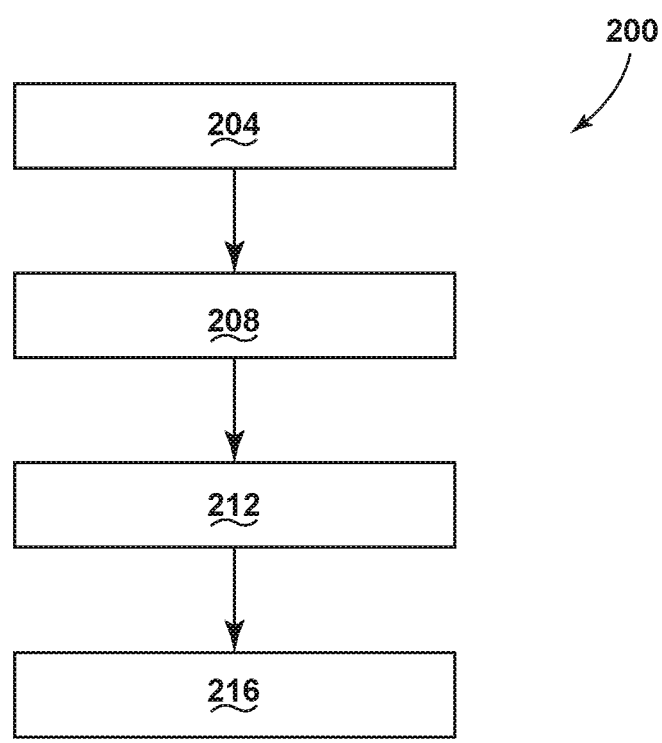
FIG. 3 is a flow diagram of a method for making a single ply roofing membrane with a silane-crosslinked polyolefin elastomer using a two-step Sioplas approach according to some aspects of the present disclosure.
Figure 4A:
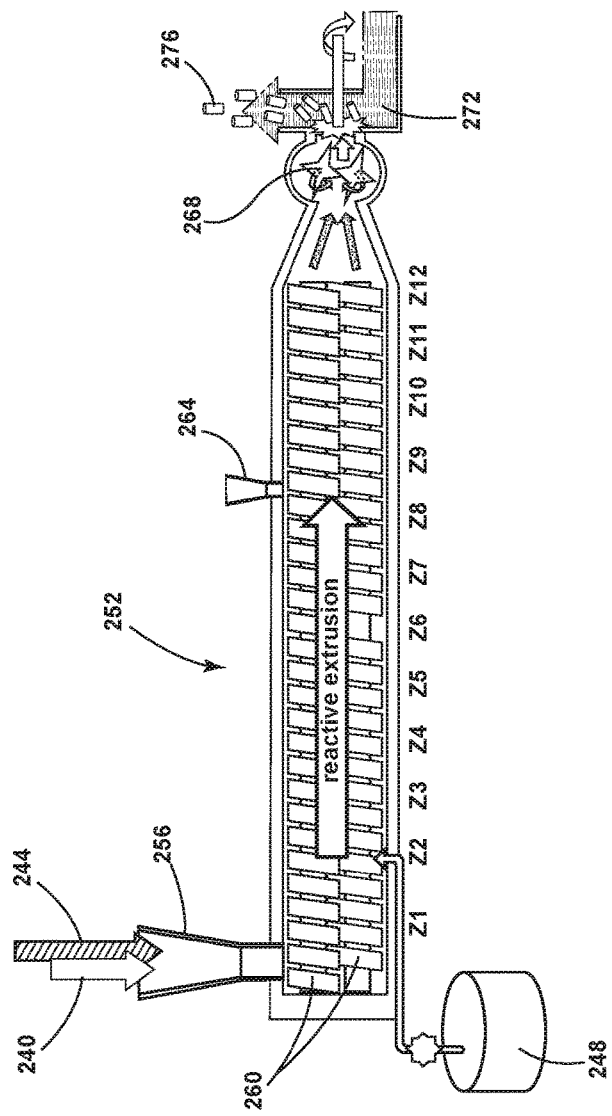
FIG. 4A is a schematic cross-sectional view of a reactive twin-screw extruder according to some aspects of the present disclosure.

Referring now to FIGS. 3 and 4A, a method 200 for making the roofing membrane 10, using the two-step Sioplas process is shown. The method 200 may begin with a step 204 that includes extruding (e.g., with a twin screw extruder 252) a first polyolefin 240 having a density less than 0.86 g/cm$^3$, a second polyolefin 244, and a silan cocktail 248 including the silane crosslinker (e.g., vinyltrimethoxy silane, VTMO) and the grafting initiator (e.g. dicumyl peroxide) together to form a silane-grafted polyolefin blend. The first polyolefin 240 and second polyolefin 244 may be added to a reactive twin screw extruder 252 using an addition hopper 256. The silan cocktail 248 may be added to the twin screws 260 further down the extrusion line to help promote better mixing with the blend of the first and second polyolefins 240, 244. A forced volatile organic compound (VOC) vacuum 264 may be used on the reactive twin screw extruder 252 to help maintain a desired reaction pressure. The twin screw extruder 252 is considered reactive because the radical initiator and silane crosslinker are reacting with and forming new covalent bonds with both the first and second polyolefins 240, 244. The melted silane-grafted polyolefin blend can exit the reactive twin screw extruder 252 using a gear pump 268 that injects the molten silane-grafted polyolefin blend into a water pelletizer 272 that can form a pelletized silane-grafted polyolefin blend 276. In some aspects, the molten silane-grafted polyolefin blend 276 may be extruded into pellets, pillows, or any other configuration prior to the incorporation of the condensation catalyst 280 (see FIG. 4B) and formation of the final article (e.g., a roofing membrane 10 as depicted in FIG. 1).

The reactive twin screw extruder 252 can be configured to have a plurality of different temperature zones (e.g., Z0-Z12 as shown in FIG. 4A) that extend for various lengths of the twin screw extruder 252. In some aspects, the respective temperature zones may have temperatures ranging from about room temperature to about 180° C., from about 120° C. to about 170° C., from about 120° C. to about 160° C., from about 120° C. to about 150° C., from about 120° C. to about 140° C., from about 120° C. to about 130° C., from about 130° C. to about 170° C., from about 130° C. to about 160° C., from about 130° C. to about 150° C., from about 130° C. to about 140° C., from about 140° C. to about 170° C., from about 140° C. to about 160° C., from about 140° C. to about 150° C., from about 150° C. to about 170° C., and from about 150° C. to about 160° C. In some aspects, Z0 may have a temperature from about 60° C. to about 110° C. or no cooling; Z1 may have a temperature from about 120° C. to about 130° C.; Z2 may have a temperature from about 140° C. to about 150° C.; Z3 may have a temperature from about 150° C. to about 160° C.; Z4 may have a temperature from about 150° C. to about 160° C.; Z5 may have a temperature from about 150° C. to about 160° C.; Z6 may have a temperature from about 150° C. to about 160° C.; Z7 may have a temperature from about 150° C. to about 160° C.; and Z8-Z12 may have a temperature from about 150° C. to about 160° C.

In some aspects, the number average molecular weight of the silane-grafted polyolefin elastomers may be in the range of from about 4,000 g/mol to about 30,000 g/mol, including from about 5,000 g/mol to about 25,000 g/mol and from about 6,000 g/mol to about 14,000 g/mol. The weight average molecular weight of the grafted polymers may be from about 8,000 g/mol to about 60,000 g/mol, including from about 10,000 g/mol to about 30,000 g/mol.

Figure 4B:
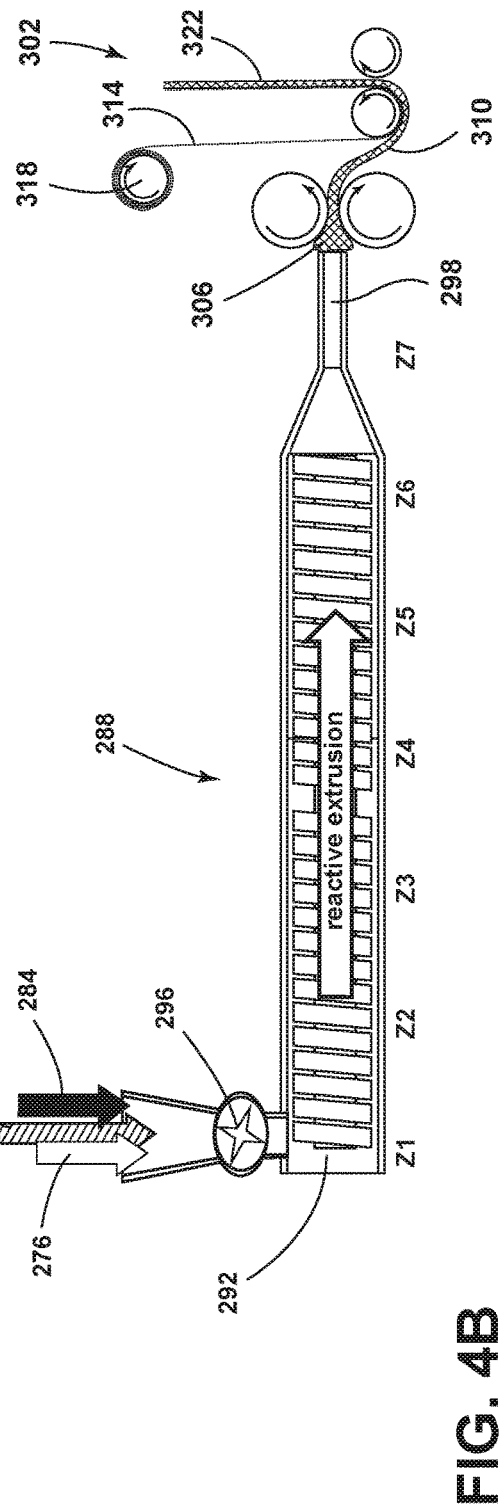
FIG. 4B is a schematic cross-sectional view of a single-screw extruder according to some aspects of the present disclosure.

Referring now to FIGS. 3 and 4B, the method 200 next includes a step 208 of extruding the silane-grafted polyolefin blend 276 and the condensation catalyst 280 together to form a silane-crosslinkable polyolefin blend 298. In some aspects, one or more optional additives 284 may be added with the silane-grafted polyolefin blend 276 and the condensation catalyst 280 to adjust the final material properties of the silane-crosslinkable polyolefin blend 298. In step 208, the silane-grafted polyolefin blend 276 is mixed with a silanol forming condensation catalyst 280 to form reactive silanol groups on the silane grafts that can subsequently crosslink when exposed to humidity and/or heat. In some aspects, the condensation catalyst 280 can include a mixture of sulfonic acid, antioxidant, process aide, and carbon black for coloring where the ambient moisture is sufficient for this condensation catalyst 280 to crosslink the silane-crosslinkable polyolefin blend 298 over a longer time period (e.g., about 48 hours). The silane-grafted polyolefin blend 276 and the condensation catalyst 280 may be added to a reactive single screw extruder 288 using an addition hopper (similar to addition hopper 256 shown in FIG. 4A) and an addition gear pump 296. The combination of the silane-grafted polyolefin blend 276 and the condensation catalyst 280, and in some aspects one or more optional additives 284, may be added to a single screw 292 of the reactive single screw extruder 288. The single screw extruder 288 is considered reactive because the silane-grafted polyolefin blend 276 and the condensation catalyst 280 are melted and combined together to mix the condensation catalyst 280 thoroughly and evenly throughout the melted silane-grafted polyolefin blend 276. The melted silane-crosslinkable polyolefin blend 298, as formed in step 208, can exit the reactive single screw extruder 288 through a die that can inject the molten silane-crosslinkable polyolefin blend 298 into the form of an uncured roofing membrane element.

During step 208, as the silane-grafted polyolefin blend 276 is extruded together with the condensation catalyst 280 to form the silane-crosslinkable polyolefin blend 298, a certain amount of crosslinking may occur. In some aspects, the silane-crosslinkable polyolefin blend 298 may be about 25% cured, about 30% cured, about 35% cured, about 40% cured, about 45% cured, about 50% cured, about 55% cured, about 60% cured, bout 65% cured, or about 70% cured, where a gel test (ASTM D2765) can be used to determine the amount of crosslinking in the final silane-crosslinked polyolefin elastomer.

Referring to FIGS. 3 and 4B, the method 200 further includes a step 212 of extruding and/or calendaring the silane-crosslinkable polyolefin elastomer or blend 298 to form the top and bottom layers 14, 38, as comprising the uncured silane-crosslinkable polyolefin elastomer. The silane-crosslinkable polyolefin elastomer or blend 298 is in a melted or molten state where it can flow and be shaped as it exits the reactive single screw extruder 288. A calendar system 302 is a device having two or more rollers (the area between the rollers is called a nip) used to process the melted silane-crosslinkable polyolefin elastomer blend 298 into a sheet or film. As the melted silane-crosslinkable polyolefin elastomer blend 298 leaves the reactive single screw extruder 288, it forms a pool of silane-crosslinkable polyolefin elastomer 306 at a first nip point of the calendar system 302. The pool of silane-crosslinkable polyolefin elastomer 306 is then pressed or rolled into the top or bottom layer 14, 38 respectively. The scrim layer 26 may be added to the top or bottom layer 14, 38, respectively, at any point during the calendaring process using a scrim roll 318. The scrim layer 26, as coupled to the top or bottom layer 14, 38, forms a partial scrim membrane 322. The partial scrim membrane 322 may be further calendared and pressed with the respectively missing top or bottom layer 14, 38 to form the uncured roofing membrane element.

Referring again to FIG. 3, the method 200 can further include a step 216 of crosslinking the silane-crosslinkable polyolefin blend 298 or the roofing membrane element in an uncured form at an ambient temperature and/or an ambient humidity to form the roofing membrane 10 (see FIG. 1) having a density from about 0.85 g/cm$^3$ to about 0.89 g/cm$^3$. More particularly, in this crosslinking process, the water hydrolyzes the silane of the silane-crosslinkable polyolefin elastomer to produce a silanol. The silanol groups on various silane grafts can then be condensed to form intermolecular, irreversible Si—O—Si crosslink sites. The amount of crosslinked silane groups, and thus the final polymer properties, can be regulated by controlling the production process, including the amount of catalyst used.

The crosslinking/curing of step 216 of the method 200 (see FIG. 3) may occur over a time period of from greater than 0 to about 20 hours. In some aspects, curing takes place over a time period of from about 1 hour to about 20 hours, 10 hours to about 20 hours, from about 15 hours to about 20 hours, from about 5 hours to about 15 hours, from about 1 hour to about 8 hours, or about 3 hours to about 6 hours. The temperature during the crosslinking/curing may be about room temperature, from about 20° C. to about 25° C., from about 20° C. to about 150° C., from about 25° C. to about 100° C., or from about 20° C. to about 75° C. The humidity during curing may be from about 30% to about 100%, from about 40% to about 100%, or from about 50% to about 100%.

In some aspects, an extruder setting is used that is capable of extruding thermoplastic, with long LID, 30 to 1, at an extruder heat setting close to TPV processing conditions wherein the extrudate crosslinks at ambient conditions becoming a thermoset in properties. In other aspects, this process may be accelerated by steam exposure. Immediately after extrusion, the gel content (also called the crosslink density) may be about 60%, but after 96 hrs at ambient conditions, the gel content may reach greater than about 95%.

In some aspects, one or more reactive single screw extruders 288 may be used to form the uncured roofing membrane element (and corresponding single ply roofing membrane 10) that has one or more types of silane-crosslinked polyolefin elastomers. For example, in some aspects, one reactive single screw extruder 288 may be used to produce and extrude a first silane-crosslinked polyolefin elastomer associated employed in a top layer 14 of a roofing membrane 10 (see FIG. 1), while a second reactive single screw extruder 288 may be used to produce and extrude a second silane-crosslinked polyolefin elastomer employed in a bottom layer 38 of the roofing membrane 10. The complexity, architecture and property requirements of the roofing membrane 10 will determine the number and types of reactive single screw extruder 288 necessary to fabricate it.

It is understood that the prior description outlining and teaching the various roofing membranes 10, and their respective components and compositions, can be used in any combination, and applies equally well to the method 200 for making the roofing membrane 10 using the two-step Sioplas process as shown in FIGS. 3, 4A and 4B.

Figure 5:
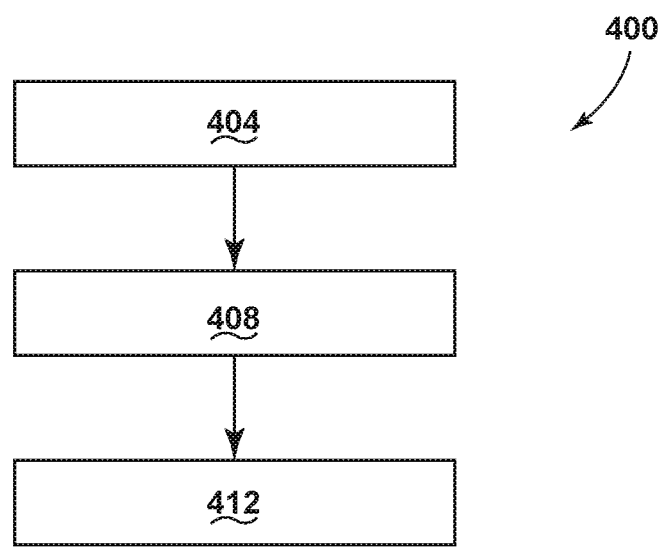
FIG. 5 is a flow diagram of a method for making a single ply roofing membrane with a silane-crosslinked polyolefin elastomer using a one-step Monosil approach according to some aspects of the present disclosure.
Figure 6:
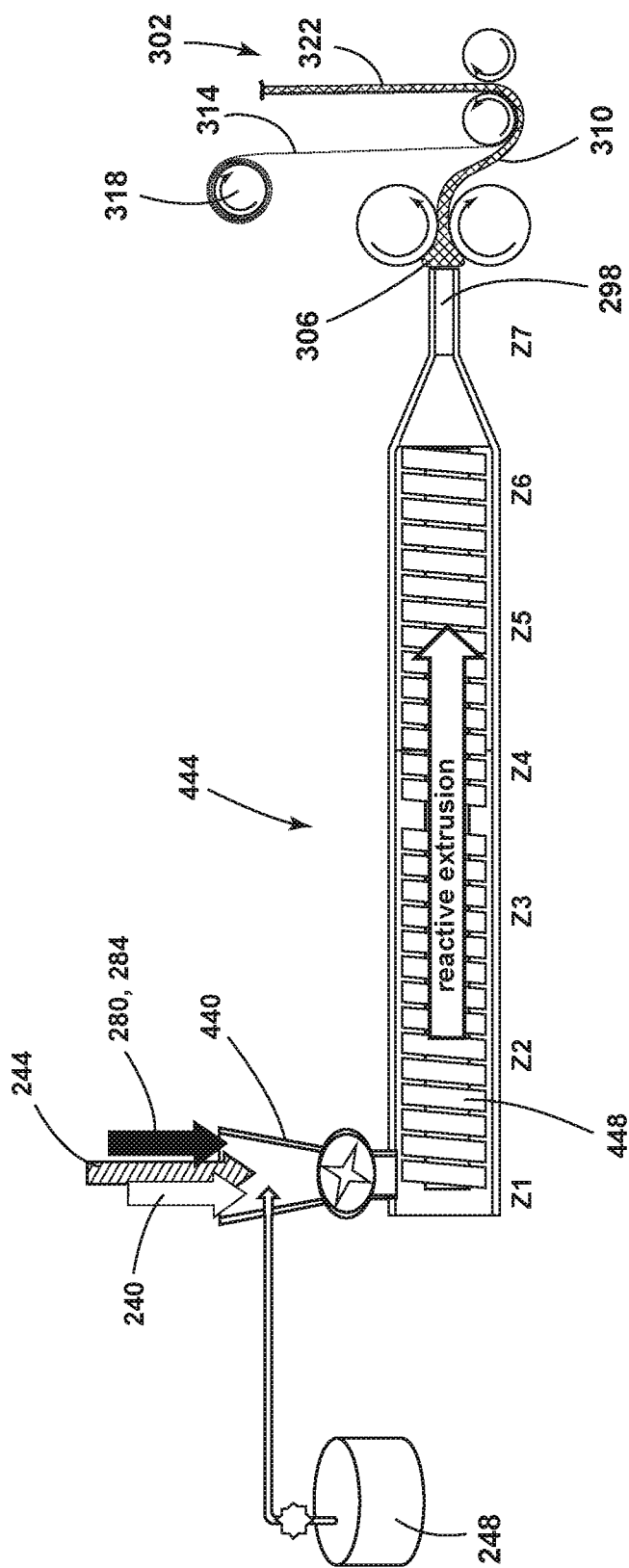
FIG. 6 is a schematic cross-sectional view of a reactive single-screw extruder according to some aspects of the present disclosure.

Referring now to FIGS. 5 and 6, a method 400 for making the roofing membrane 10 using the one-step Monosil process is shown. The method 400 may begin with a step 404 that includes extruding (e.g., with a single screw extruder 444) the first polyolefin 240 having a density less than 0.86 g/cm$^3$, the second polyolefin 244, the silan cocktail 248 including the silane crosslinker (e.g., vinyltrimethoxy silane, VTMO) and grafting initiator (e.g. dicumyl peroxide), and the condensation catalyst 280 together to form the crosslinkable silane-grafted polyolefin blend 298. The first polyolefin 240, second polyolefin 244, and silan cocktail 248 may be added to the reactive single screw extruder 444 using an addition hopper 440. In some aspects, the silan cocktail 248 may be added to a single screw 448 further down the extrusion line to help promote better mixing with the first and second polyolefin 240, 244 blend. In some aspects, one or more optional additives 284 may be added with the first polyolefin 240, second polyolefin 244, condensation catalyst 280 and silan cocktail 248 to adjust the final material properties of the silane-crosslinkable polyolefin blend 298. The single screw extruder 444 is considered reactive because the grafting initiator and silane crosslinker of the silan cocktail 248 are reacting with and forming new covalent bonds with both the first and second polyolefins 240, 244. In addition, the reactive single screw extruder 444 mixes the condensation catalyst 280 in together with the melted silane-grafted polyolefin blend comprising the first and second polyolefins 240, 244, silan cocktail 248 and any optional additives 284. The resulting melted silane-crosslinkable polyolefin blend 298 can exit the reactive single screw extruder 444 using a gear pump (not shown) and/or die that can eject the molten silane-crosslinkable polyolefin blend 298 into the form of an uncured roofing membrane element.

During step 404, as the first polyolefin 240, second polyolefin 244, silan cocktail 248, and condensation catalyst 280 are extruded together, a certain amount of crosslinking may occur in the reactive single screw extruder 444 to the silane-crosslinkable blend 298. In some aspects, the silane-crosslinkable polyolefin blend 298 may be about 25% cured, about 30% cured, about 35% cured, about 40% cured, about 45% cured, about 50% cured, about 55% cured, about 60% cured, bout 65% cured, or about 70% as it leaves the reactive single screw extruder 444. The gel test (ASTM D2765) can be used to determine the amount of crosslinking in the final silane-crosslinked polyolefin elastomer.

The reactive single screw extruder 444 can be configured to have a plurality of different temperature zones (e.g., Z0-Z7 as shown in FIG. 6) that extend for various lengths along the extruder. In some aspects, the respective temperature zones may have temperatures ranging from about room temperature to about 180° C., from about 120° C. to about 170° C., from about 120° C. to about 160° C., from about 120° C. to about 150° C., from about 120° C. to about 140° C., from about 120° C. to about 130° C., from about 130° C. to about 170° C., from about 130° C. to about 160° C., from about 130° C. to about 150° C., from about 130° C. to about 140° C., from about 140° C. to about 170° C., from about 140° C. to about 160° C., from about 140° C. to about 150° C., from about 150° C. to about 170° C., and from about 150° C. to about 160° C. In some aspects, Z0 may have a temperature from about 60° C. to about 110° C. or no cooling; Z1 may have a temperature from about 120° C. to about 130° C.; Z2 may have a temperature from about 140° C. to about 150° C.; Z3 may have a temperature from about 150° C. to about 160° C.; Z4 may have a temperature from about 150° C. to about 160° C.; Z5 may have a temperature from about 150° C. to about 160° C.; Z6 may have a temperature from about 150° C. to about 160° C.; and Z7 may have a temperature from about 150° C. to about 160° C.

In some aspects, the number average molecular weight of the silane-grafted polyolefin elastomers may be in the range of from about 4,000 g/mol to about 30,000 g/mol, including from about 5,000 g/mol to about 25,000 g/mol and from about 6,000 g/mol to about 14,000 g/mol. The weight average molecular weight of the grafted polymers may be from about 8,000 g/mol to about 60,000 g/mol, including from about 10,000 g/mol to about 30,000 g/mol.

Referring to FIGS. 5 and 6, the method 400 further includes a step 408 of extruding and/or calendaring the silane-crosslinkable polyolefin elastomer or blend 298 to form the top and bottom layers 14, 38, as comprising the uncured silane-crosslinkable polyolefin elastomer. The silane-crosslinkable polyolefin elastomer or blend 298 is in a melted or molten state where it can flow and be shaped as it exits the reactive single screw extruder 444. As previously mentioned, the calendar system 302 is a device having two or more rollers (the area between the rollers is called a nip) used to process the melted silane-crosslinkable polyolefin elastomer blend 298 into a sheet or film. As the melted silane-crosslinkable polyolefin elastomer blend 298 leaves the reactive single screw extruder 444, it forms a pool of silane-crosslinkable polyolefin elastomer 306 at a first nip point of the calendar system 302. The pool of silane-crosslinkable polyolefin elastomer 306 is then pressed or rolled into the top or bottom layer 14, 38, respectively. The scrim layer 26 may be added to the top or bottom layer 14, 38 respectively at any point during the calendaring process using a scrim roll 318. The scrim layer 26, as coupled to the top or bottom layer 14, 38, forms a partial scrim membrane 322. The partial scrim membrane 322 may be further calendared and pressed with the respectively missing top or bottom layer 14, 38 to form an uncured roofing membrane element.

Still referring to FIG. 5, the method 400 can further include a step 412 of crosslinking the silane-crosslinkable polyolefin blend 298 of the uncured roofing membrane element at an ambient temperature and an ambient humidity to form the element into the roofing membrane 10 (see FIG. 1) having a density from about 0.85 g/cm$^3$ to about 0.89 g/cm$^3$. The amount of crosslinked silane groups, and thus the final polymer properties of the roofing membrane 10, can be regulated by controlling the production process, including the amount of catalyst used.

The step 412 of crosslinking the silane-crosslinkable polyolefin blend 298 may occur over a time period of from greater than 0 to about 20 hours. In some aspects, curing takes place over a time period of from about 1 hour to about 20 hours, 10 hours to about 20 hours, from about 15 hours to about 20 hours, from about 5 hours to about 15 hours, from about 1 hour to about 8 hours, or from about 3 hours to about 6 hours. The temperature during the crosslinking and curing may be about room temperature, from about 20° C. to about 25° C., from about 20° C. to about 150° C., from about 25° C. to about 100° C., or from about 20° C. to about 75° C. The humidity during curing may be from about 30% to about 100%, from about 40% to about 100%, or from about 50% to about 100%.

In some aspects, an extruder setting is used that is capable of extruding thermoplastic, with long LID, 30 to 1, at an extruder heat setting close to TPV processing conditions wherein the extrudate crosslinks at ambient conditions becoming a thermoset in properties. In other aspects, this process may be accelerated by steam exposure. Immediately after extrusion, the gel content (also called the crosslink density) may be about 60%, but after 96 hrs at ambient conditions, the gel content may reach greater than about 95%.

In some aspects, one or more reactive single screw extruders 444 may be used to form the roofing membrane 10 that has one or more types of silane-crosslinked polyolefin elastomers. For example, in some aspects, one reactive single screw extruder 444 may be used to produce and extrude a first silane-crosslinked polyolefin elastomer associated with the top layer 14 of the roofing membrane 10 (see FIG. 1), while a second reactive single screw extruder 444 may be used to produce and extrude a second silane-crosslinked polyolefin elastomer associated with the bottom layer 38 of the roofing membrane 10. The complexity, architecture and required properties of the final roofing membrane 10 will determine the number and types of reactive single screw extruders 444 employed according to the method 400 depicted in FIG. 5.

It is understood that the prior description outlining and teaching of the various roofing membranes 10, and their respective components and compositions, can be used in any combination, and applies equally well to the method 400 for making the roofing membrane 10 using the one-step Monosil process as shown in FIGS. 5 and 6.

Silane-Crosslinked Polyolefin Elastomer Physical Properties

A "thermoplastic", as used herein, is defined to mean a polymer that softens when exposed to heat and returns to its original condition when cooled to room temperature. A "thermoset", as used herein, is defined to mean a polymer that solidifies and irreversibly "sets" or "crosslinks" when cured. In either of the Monosil or Sioplas processes described above, it is important to understand the careful balance of thermoplastic and thermoset properties of the various different materials used to produce the final thermoset silane-crosslinked polyolefin elastomer or roofing membrane 10. Each of the intermediate polymer materials mixed and reacted using a reactive twin screw extruder, and/or a reactive single screw extruder are thermosets. Accordingly, the silane-grafted polyolefin blend 276 and the silane-crosslinkable polyolefin blend 298 are thermoplastics and can be softened by heating so the respective materials can flow. Once the silane-crosslinkable polyolefin blend 298 is extruded, molded, pressed, and/or shaped into the uncured roofing membrane element or other respective article, the silane-crosslinkable polyolefin blend 298 can begin to crosslink or cure at an ambient temperature and an ambient humidity to form the roofing membrane 10 (or other end product form), as comprising one or more silane-crosslinked polyolefin blends.

The thermoplastic/thermoset behavior of the silane-crosslinkable polyolefin blend 298 and corresponding silane-crosslinked polyolefin blend are important for the various compositions and articles disclosed herein (e.g., roofing membrane 10 shown in FIG. 1) because of the potential energy savings provided using these materials. For example, a manufacturer can save considerable amounts of energy by being able to cure the silane-crosslinkable polyolefin blend 298 at an ambient temperature and an ambient humidity. This curing process is typically performed in the industry by applying significant amounts of energy to heat or steam treat crosslinkable polyolefins 298. The ability to cure the inventive silane-crosslinkable polyolefin blend 298 with ambient temperature and/or ambient humidity is not a capability necessarily intrinsic to crosslinkable polyolefins. Rather, this capability or property is dependent on the relatively low density of the silane-crosslinkable polyolefin blend 298. In some aspects, no additional curing overs, heating ovens, steam ovens, or other forms of heat producing machinery other than what was provided in the extruders are used to form the silane-crosslinked polyolefin elastomers.

The specific gravity of the silane-crosslinked polyolefin elastomer of the present disclosure may be lower than the specific gravities of existing TPV and EPDM formulations used in the art. The reduced specific gravity of these materials can lead to lower weight parts, thereby facilitating additional ease-of-assembly for roofers and other individuals charged with installing the roofing membranes 10 of the disclosure. For example, the specific gravity of the silane-crosslinked polyolefin elastomer of the present disclosure may be from about 0.80 g/cm$^3$ to about 1.50 g/cm$^3$, from about 1.25 g/cm$^3$ to about 1.45 g/cm$^3$, from about 1.30 g/cm$^3$ to about 1.40 g/cm$^3$, about 1.25 g/cm$^3$, about 1.30 g/cm$^3$, about 1.35 g/cm$^3$, about 1.40 g/cm$^3$, about 1.45 g/cm$^3$, about 1.50 g/cm$^3$, less than 1.75 g/cm$^3$, less than 1.60 g/cm$^3$, less than 1.50 g/cm$^3$, or less than 1.45 g/cm$^3$, as compared to conventional TPV materials which may have a specific gravity greater than 2.00 g/cm$^3$ and conventional EPDM materials which may have a specific gravity of from 2.0 g/cm$^3$ to 3.0 g/cm$^3$.

Figure 7:
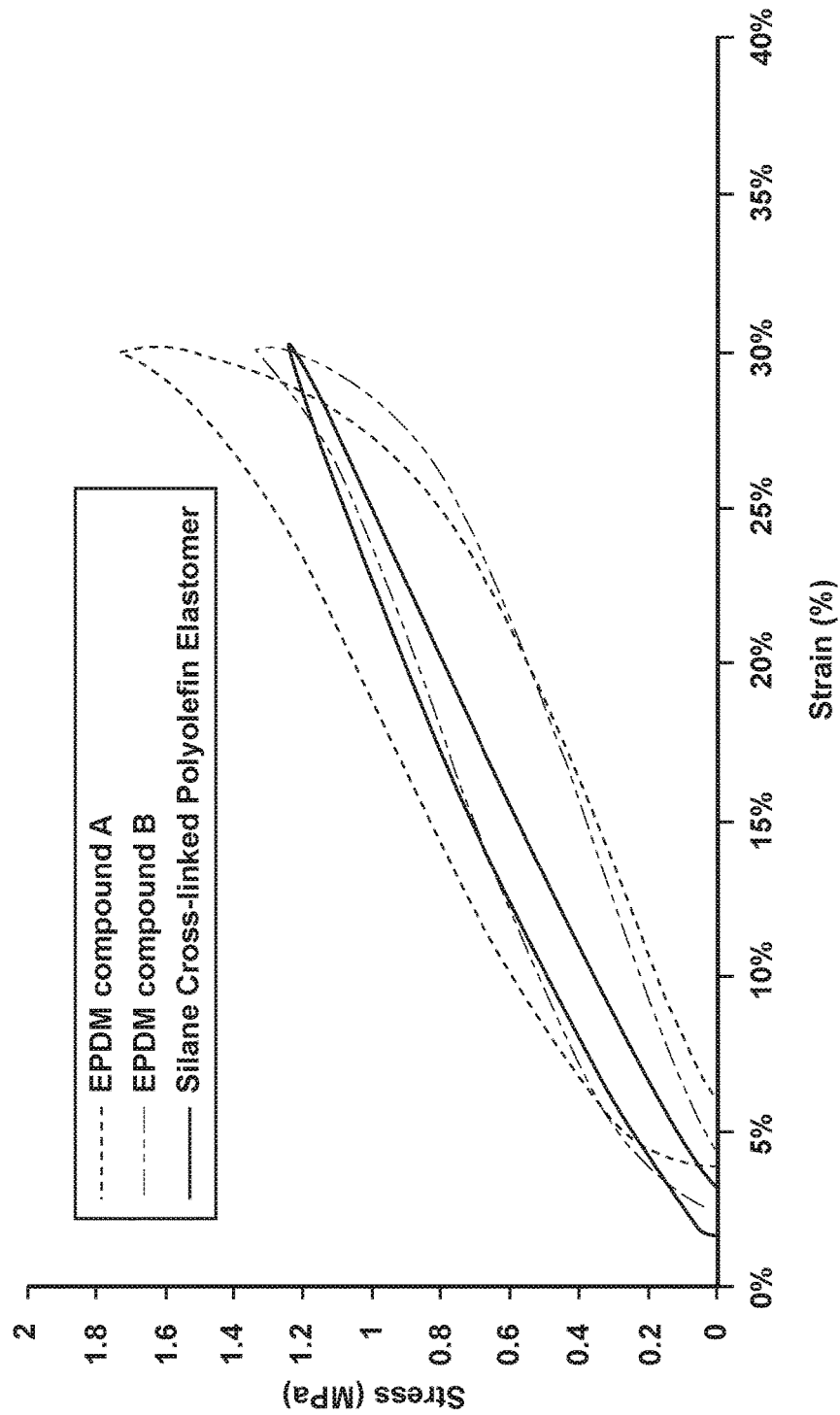
FIG. 7 is a graph illustrating the stress/strain behavior of a silane-crosslinked polyolefin elastomer, according to aspects of the disclosure, as compared to conventional EPDM compounds.

The stress/strain behavior of an exemplary silane-crosslinked polyolefin elastomer of the present disclosure (i.e., "silane-crosslinked polyolefin elastomer") relative to two existing EPDM materials is provided. In particular, FIG. 7 displays a smaller area between the stress/strain curves for the silane-crosslinked polyolefin of the disclosure (labeled as "Silane Cross-linked Polyolefin Elastomer" in FIG. 7), as compared to the areas between the stress/strain curves of EPDM compound A and EPDM compound B. This smaller area between the stress/strain curves for the silane-crosslinked polyolefin elastomer can be desirable for roofing membranes 10. Elastomeric materials typically have non-linear stress/strain curves with a significant loss of energy when repeatedly stressed. The silane-crosslinked polyolefin elastomers of the present disclosure may exhibit greater elasticity and less viscoelasticity (e.g., have linear curves and exhibit very low energy loss). Embodiments of the silane-crosslinked polyolefin elastomers described herein do not have any filler or plasticizer incorporated into these materials so their corresponding stress/strain curves do not have or display any Mullins effect and/or Payne effect. The lack of Mullins effect for these silane-crosslinked polyolefin elastomers is due to the lack of any filler or plasticizer added to the silane-crosslinked polyolefin blend so the stress/strain curve does not depend on the maximum loading previously encountered where there is no instantaneous and irreversible softening. The lack of Payne effect for these silane-crosslinked polyolefin elastomers is due to the lack of any filler or plasticizer added to the silane-crosslinked polyolefin blend so the stress/strain curve does not depend on the small strain amplitudes previously encountered where there is no change in the viscoelastic storage modulus based on the amplitude of the strain.

The silane-crosslinked polyolefin elastomer or roofing membrane 10 can exhibit a compression set of from about 5.0% to about 30.0%, from about 5.0% to about 25.0%, from about 5.0% to about 20.0%, from about 5.0% to about 15.0%, from about 5.0% to about 10.0%, from about 10.0% to about 25.0%, from about 10.0% to about 20.0%, from about 10.0% to about 15.0%, from about 15.0% to about 30.0%, from about 15.0% to about 25.0%, from about 15.0% to about 20.0%, from about 20.0% to about 30.0%, or from about 20.0% to about 25.0%, as measured according to ASTM D 395 (22 hrs @ 23° C., 70° C., 80° C., 90° C., 125° C., and/or 175° C.).

In other implementations, the silane-crosslinked polyolefin elastomer or roofing membrane 10 can exhibit a compression set of from about 5.0% to about 20.0%, from about 5.0% to about 15.0%, from about 5.0% to about 10.0%, from about 7.0% to about 20.0%, from about 7.0% to about 15.0%, from about 7.0% to about 10.0%, from about 9.0% to about 20.0%, from about 9.0% to about 15.0%, from about 9.0% to about 10.0%, from about 10.0% to about 20.0%, from about 10.0% to about 15.0%, from about 12.0% to about 20.0%, or from about 12.0% to about 15.0%, as measured according to ASTM D 395 (22 hrs @ 23° C., 70° C., 80° C., 90° C., 125° C., and/or 175° C.).

The silane-crosslinked polyolefin elastomer or roofing membrane 10 may exhibit a crystallinity of from about 5% to about 40%, from about 5% to about 25%, from about 5% to about 15%, from about 10% to about 20%, from about 10% to about 15%, or from about 11% to about 14% as determined using density measurements, differential scanning calorimetry (DSC), X-Ray Diffraction, infrared spectroscopy, and/or solid state nuclear magnetic spectroscopy. As disclosed herein, DSC was used to measure the enthalpy of melting in order to calculate the crystallinity of the respective samples.

The silane-crosslinked polyolefin elastomer or roofing membrane 10 may exhibit a glass transition temperature of from about −75° C. to about −25° C., from about −65° C. to about −40° C., from about −60° C. to about −50° C., from about −50° C. to about −25° C., from about −50° C. to about −30° C., or from about −45° C. to about −25° C. as measured according to differential scanning calorimetry (DSC) using a second heating run at a rate of 5° C./min or 10° C./min.

The silane-crosslinked polyolefin elastomer or roofing membrane 10 may exhibit a weathering color difference of from about 0.25 ΔE to about 2.0 ΔE, from about 0.25 ΔE to about 1.5 ΔE, from about 0.25 ΔE to about 1.0 ΔE, or from about 0.25 ΔE to about 0.5 ΔE, as measured according to ASTM D2244. In some embodiments, the roofing membrane 10 may be a high-load flame retardant thermoplastic polyolefin (TPO) having the above weathering properties.

EXAMPLES

The following non-limiting examples are provided as exemplary embodiments to further outline aspects of the disclosure.

Materials

All chemicals, constituents and precursors were obtained from commercial suppliers and used as provided without further purification.

Example 1—Preparation of the Vane-Grafted Polyolefin Elastomer

Example 1 (Ex. 1) or ED76-4A was produced by extruding 82.55 wt % ENGAGE™ 8842 and 14.45 wt % MOSTEN™ TB 003 together with 3.0 wt % SILAN RHS 14/032 or SILFIN 29 to form a silane-grafted polyolefin elastomer, according to one of the foregoing methods outlined in the disclosure. The Example 1 silane-grafted polyolefin elastomer was then extruded using various condensation catalysts and fillers to form a silane-crosslinkable polyolefin elastomer, as suitable for top and bottom layers 14, 38 of a roofing membrane (as described below in Example 2). The composition of the Example 1 silane-grafted polyolefin elastomer is provided in Table 1 below.

TABLE 1

| Ingredients | Example 1 |
|---|---|
| ENGAGE 8842 | 82.55 |
| MOSTEN TB 003 | 14.45 |
| SILFIN 29 | 3.00 |
| TOTAL | 100 |

Example 2—Preparation of the Roofing Membrane

In this example, identical top and bottom layers 14, 38 were used to produce an embodiment of a single ply roofing membrane 10. In particular, the top and bottom layers 14 38 were produced by extruding 29.0 wt % silane-grafted polyolefin elastomer (from Example 1) and 70.0 wt % vinyl silane coated magnesium dihydroxide, Mg(OH)$_2$ (MDH), together with 1.0 wt % dioctyltin dilaurate (DOTL) condensation catalyst to form a silane-crosslinkable polyolefin elastomer blend. The blend was then extruded and calendared to provide the respective top and bottom layers 14, 38 of an uncured roofing membrane element. The silane-crosslinkable polyolefin elastomer of the layers 14, 38 of the uncured roofing membrane element was then cured at ambient temperature and humidity to form the roofing membrane 10. The composition of the roofing membrane 10 formed in this example is provided in Table 2 below.

Example 3—Preparation of the Roofing Membrane

In this example, identical top and bottom layers 14, 38 were used to produce another embodiment of a single ply roofing membrane 10. In particular, the top and bottom layers 14, 38 were produced by extruding 29.0 wt % silane-grafted polyolefin elastomer (from Example 1) and 70.0 wt % stearic acid coated magnesium dihydroxide, Mg(OH)$_2$ (MDH), together with 1.0 wt % dioctyltin dilaurate (DOTL) condensation catalyst to form a silane-crosslinkable polyolefin elastomer blend. The blend was then extruded and calendared to provide the respective top and bottom layers 14, 38 of an uncured roofing membrane element. The silane-crosslinkable polyolefin elastomer of the layers 14, 38 of the uncured roofing membrane element was then cured at ambient temperature and humidity to form the roofing membrane 10. The composition of the roofing membrane 10 formed in this example is also provided in Table 2 below.

TABLE 2

Comparison of Roofing Membranes

| Example | Sample | ED 76-4A (wt %) | Vinyl Silane coated MDH (wt %) | Stearic Acid coated MDH (wt %) | DOTL Catalyst (wt %) |
|---|---|---|---|---|---|
| Example 2 | Top Layer | 29 | 70 | — | 1 |
| Example 2 | Bottom Layer | 29 | 70 | — | 1 |
| Example 3 | Top Layer | 29 | — | 70 | 1 |
| Example 3 | Bottom Layer | 29 | — | 70 | 1 |

Figure 8:
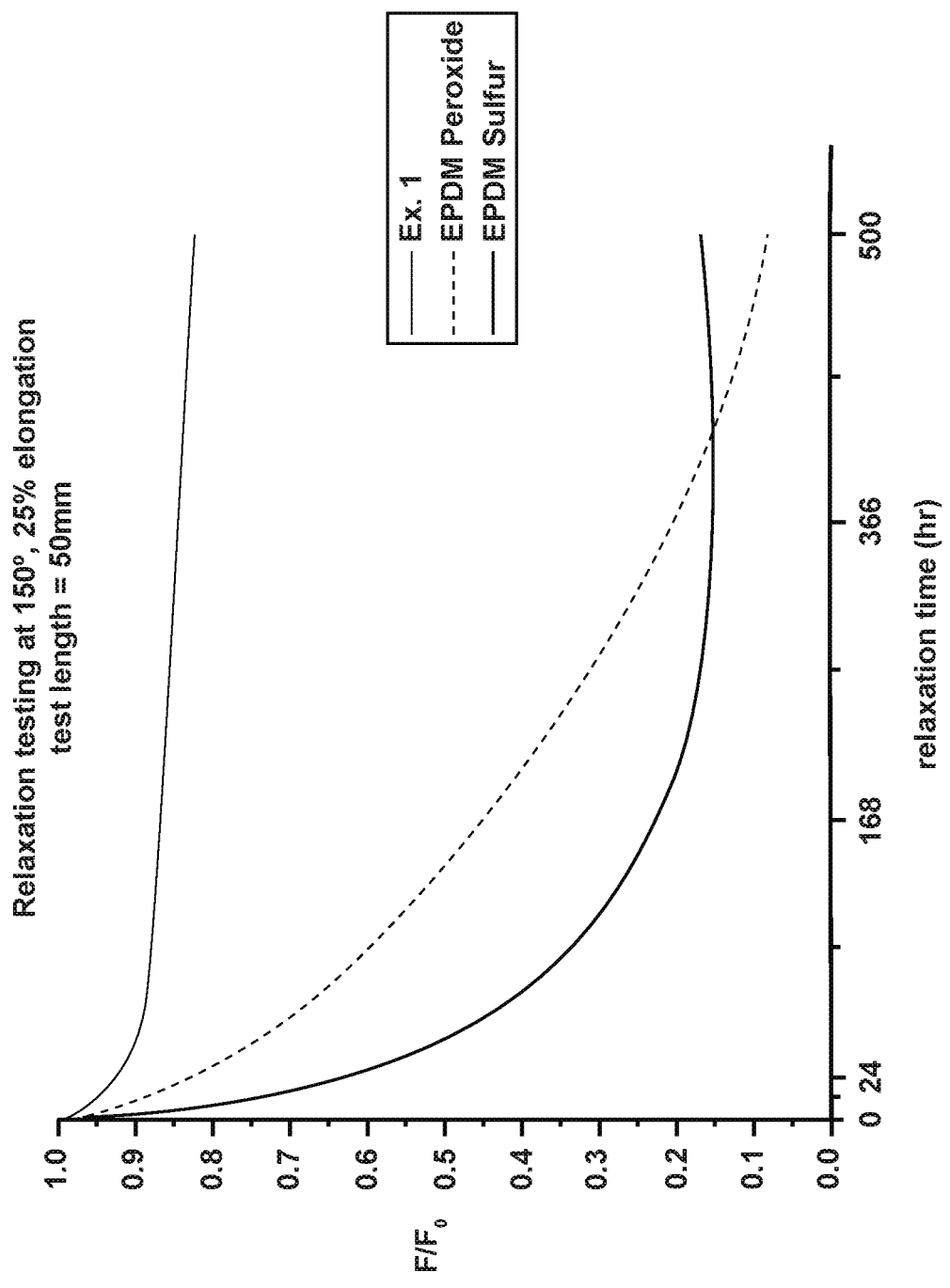
FIG. 8 is a relaxation plot of an exemplary silane-crosslinked polyolefin elastomer, suitable for a roofing membrane according to aspects of the disclosure, and comparative EPDM cross-linked materials.

Referring now to FIG. 8, the thermal stability of Example 1 is provided with respect to a comparative EPDM peroxide crosslinked resin and a comparative EPDM sulfur crosslinked resin. As shown, Example 1 can retain nearly 90% of its elastic properties at 150° C. for greater than 500 hrs. The retention of elastic properties as provided in Example 1 is representative of each of the inventive silane-crosslinked polyolefin elastomers disclosed herein. The roofing member made from these silane-crosslinked polyolefin elastomers may retain up to 60%, 70%, 80%, or 90% of its elastic properties as determined by using Stress Relaxation measurements at 150° C. for greater than 100 hrs, greater than 200 hrs, greater than 300 hrs, greater than 400 hrs, and greater than 500 hrs.

Figure 9:
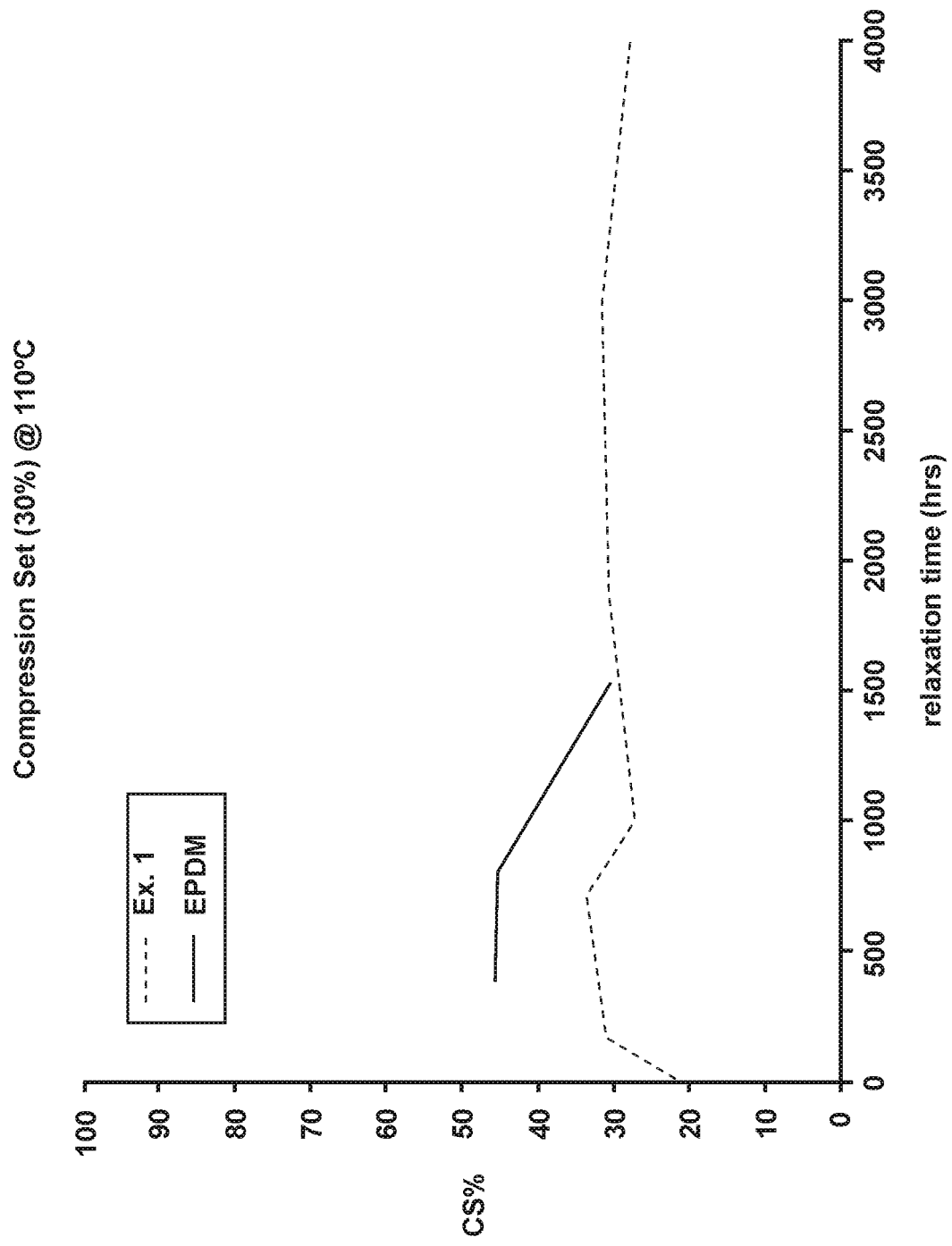
FIG. 9 is a compression set plot of an exemplary silane-crosslinked polyolefin elastomer suitable for a roofing membrane, and a comparative EPDM cross-linked material.

Referring now to FIG. 9, the compression set values are provided across a time period of 4,000 hrs for Ex. 1 that demonstrates the superior long term retention of elastic properties of the silane-crosslinked polyolefin elastomer material used to make the roofing membrane 10. As provided, the Ex. 1 silane-crosslinked polyolefin elastomer material maintains a compression set of 35% or lower as measured according to ASTM D 395 (30% @ 110° C.). The ability of these silane-crosslinked polyolefin elastomer materials used in roofing membranes 10 to retain its elasticity (compression set %) over a long period of time upon exposure to heat that simulates exterior weathering or aging is provided by this representative example of these roofing membrane 10 materials.

For purposes of this disclosure, the term "coupled" (in all of its forms, couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the articles, processes and compositions, which are defined by the following claims as interpreted according to the principles of patent law, including the Doctrine of Equivalents.

Listing of Non-Limiting Embodiments

Embodiment A is a roofing membrane comprising: a top layer comprising a flame retardant and a first silane-crosslinked polyolefin elastomer having a density less than 0.90 g/cm$^3$; a scrim layer; and a bottom layer comprising a flame retardant and a second silane-crosslinked polyolefin elastomer having a density less than 0.90 g/cm$^3$, wherein the top and bottom layers of the single ply roofing membrane both exhibit a compression set of from about 5.0% to about 35.0%, as measured according to ASTM D 395 (22 hrs @ 70° C.).

The roofing membrane of Embodiment A wherein the compression set is from about 10% to about 30%.

The roofing membrane of Embodiment A or Embodiment A with any of the intervening features wherein the first and second silane-crosslinked polyolefin elastomers both exhibit a crystallinity of from about 5% to about 25%.

The roofing membrane of Embodiment A or Embodiment A with any of the intervening features wherein the first and second silane-crosslinked polyolefin elastomers have a glass transition temperature of from about −75° C. to about −25° C.

The roofing membrane of Embodiment A or Embodiment A with any of the intervening features wherein the first and second silane-crosslinked polyolefin elastomers each comprise a first polyolefin having a density less than 0.86 g/cm$^3$, a second polyolefin, a silane crosslinker, a grafting initiator, and a condensation catalyst.

The roofing membrane of Embodiment A or Embodiment A with any of the intervening features wherein the density is from about 0.85 g/cm$^3$ to about 0.89 g/cm$^3$.

The roofing membrane of Embodiment A or Embodiment A with any of the intervening features wherein the single ply roofing membrane exhibits a weathering color difference of from about 0.25 ΔE to about 2.0 ΔE, as measured according to ASTM D2244.

The roofing membrane of Embodiment A or Embodiment A with any of the intervening features wherein the first silane-crosslinked polyolefin elastomer and the second silane-crosslinked polyolefin elastomer are chemically distinct from each other.

Embodiment B is a method of making a roofing membrane, the method comprising: extruding a first silane-crosslinkable polyolefin elastomer to form a top layer; extruding a second silane-crosslinkable polyolefin elastomer to form a bottom layer; calendaring a scrim layer between the top and the bottom layers to form an uncured roofing membrane element; and crosslinking the silane-crosslinkable polyolefin elastomers of the top and the bottom layers in the uncured roofing membrane element at a curing temperature and a curing humidity to form the single ply roofing membrane, wherein the top and bottom layers of the single ply roofing membrane both exhibit a compression set of from about 5.0% to about 35.0%, as measured according to ASTM D 395 (22 hrs @ 70° C.).

The method of Embodiment B wherein the first silane-crosslinkable polyolefin elastomer and the second silane-crosslinkable polyolefin elastomer are chemically distinct from each other.

The method of Embodiment B or Embodiment B with any of the intervening features wherein the curing temperature is an ambient temperature.

The method of Embodiment B or Embodiment B with any of the intervening features wherein the curing humidity is an ambient humidity.

The method of Embodiment B or Embodiment B with any of the intervening features wherein the first and second silane-crosslinkable polyolefin elastomers each comprise a first polyolefin having a density less than 0.86 g/cm$^3$, a second polyolefin, a silane crosslinker, a grafting initiator, and a condensation catalyst.

The method of Embodiment B or Embodiment B with any of the intervening features wherein the single ply roofing membrane exhibits a weathering color difference of from about 0.25 ΔE to about 2.0 ΔE, as measured according to ASTM D2244.

The method of Embodiment B or Embodiment B with any of the intervening features wherein the single ply roofing membrane exhibits a flame retardance rating of classification D as measured in accordance with the EN ISO 11925-2 surface exposure test.

Embodiment C is a method of making a high-load flame retardant thermoplastic polyolefin (TPO) roofing membrane, the method comprising: adding a silane-grafted polyolefin elastomer, a flame retardant, and a condensation catalyst to a reactive single screw extruder to produce a silane-crosslinkable polyolefin elastomer; calendaring the silane-crosslinkable polyolefin elastomer to form a top layer and a bottom layer; calendaring a scrim layer between the top and the bottom layers to form an uncured roofing membrane element; and crosslinking the silane-crosslinkable polyolefin elastomers of the top and the bottom layers in the uncured roofing membrane element at an ambient temperature and an ambient humidity to form the thermoplastic polyolefin (TPO) roofing membrane, wherein the top and bottom layers of the thermoplastic polyolefin (TPO) roofing membrane both exhibit a compression set of from about 5.0% to about 35.0%, as measured according to ASTM D 395 (22 hrs @ 70° C.).

The method of Embodiment C wherein the top and bottom layers are chemically equivalent to each other.

The method of Embodiment C or Embodiment C with any of the intervening features wherein the single ply roofing membrane exhibits a flame retardance rating of classification D as measured in accordance with the EN ISO 11925-2 surface exposure test.

The method of Embodiment C or Embodiment C with any of the intervening features wherein the silane-grafted polyolefin elastomer comprises a first polyolefin having a density less than 0.86 g/cm$^3$, a second polyolefin, a silane crosslinker, a grafting initiator.

The method of Embodiment C or Embodiment C with any of the intervening features wherein the high-load flame retardant thermoplastic polyolefin (TPO) roofing membrane exhibits a weathering color difference of from about 0.25 ΔE to about 2.0 ΔE, as measured according to ASTM D2244.

What is claimed is:

1. A roofing membrane comprising:
   a top layer comprising a flame retardant and a first silane-crosslinked polyolefin elastomer having a density less than 1.45 g/cm$^3$;
   an optional scrim layer; and
   a bottom layer comprising a flame retardant and a second silane-crosslinked polyolefin elastomer having a density less than 1.45 g/cm$^3$;
   wherein the gel content of the roofing membrane is greater than about 60%; and
   wherein at least one of the first silane-crosslinked polyolefin elastomer or the second silane-polyolefin elastomer comprises a polyolefin selected from a propylene/$C_3$-$C_{20}$ α-olefin copolymer or a blend of propylene/α-olefin copolymer with an ethylene/α-olefin copolymer wherein both the propylene/α-olefin copolymer and the ethylene/α-olefin copolymer of the blend are silane-grafted,
   wherein the first and second silane-crosslinked polyolefin elastomers have a glass transition temperature of from about −75° C. to about −25° C.

2. A roofing membrane comprising:
   a top layer comprising a flame retardant and a first silane-crosslinked polyolefin elastomer having a density less than 1.45 g/cm-$^3$;
   bottom layer comprising a flame retardant and a second silane-crosslinked polyolefin elastomer having a density less than 1.45 g/cm-$^3$; and
   a scrim layer between, and in contact with, the top layer and the bottom layer,
   wherein the gel content of the roofing membrane is greater than about 60%;
   wherein the first and second silane-crosslinked polyolefin elastomers were prepared by extruding each comprise a first polyolefin having a density less than 0.86 g/cm-$^3$, a second polyolefin, a silane crosslinker, a grafting initiator, and a condensation catalyst; and
   wherein at least one of the first polyolefin or the second polyolefin comprises a polyolefin selected from a propylene/$C_3$-$C_{20}$ α-olefin a olefin copolymer or a blend of propylene/α-olefin copolymer with an ethylene/α-olefin copolymer wherein both the propylene propylene/α-olefin copolymer and the ethylene/α-olefin copolymer of the blend are silane-grafted,
   wherein the first and second silane-crosslinked polyolefin elastomers have a glass transition temperature of from about −75° C. to about −25° C.

3. The roofing membrane of claim 2, wherein the flame retardant comprises a magnesium hydroxide and/or an aluminum hydroxide from about 20 wt % to about 70 wt %.

4. The roofing membrane of claim 2, wherein the first and second silane-crosslinked polyolefin elastomers both exhibit a crystallinity of from about 5% to about 25%.

5. The roofing membrane of claim 2, wherein the density of the roofing membrane is from about 0.85 g/cm-$^3$ to about 1.45 g/cm-$^3$.

6. The roofing membrane of claim 2, wherein the first polyolefin is an ethylene/α-olefin copolymer from about 60 wt % to about 97 wt %.

7. The roofing membrane of claim 2, wherein the silane crosslinker comprises a vinyltrimethoxy silane from about 1 wt % to about 4 wt %.

8. The roofing membrane of claim 2, wherein the condensation catalyst comprises a sulfonic ester from about 1 wt % to about 4 wt %.

9. The roofing membrane of claim 2, wherein the gel content is between about 60% and about 95%.

* * * * *